United States Patent [19]

Akao et al.

[11] Patent Number: 5,511,211
[45] Date of Patent: Apr. 23, 1996

[54] METHOD FOR FLEXIBLY DEVELOPING A DATA PROCESSING SYSTEM COMPRISING REWRITING INSTRUCTIONS IN NON-VOLATILE MEMORY ELEMENTS AFTER FUNCTION CHECK INDICATES FAILURE OF REQUIRED FUNCTIONS

[75] Inventors: Yasushi Akao, Kokubunji; Shiro Baba, Tokorozawa; Terumi Sawase, Hannou; Yoshimune Hagiwara, Hachioji, all of Japan

[73] Assignee: Hitachi, Ltd., Tokyo, Japan

[21] Appl. No.: 102,156

[22] Filed: Aug. 4, 1993

Related U.S. Application Data

[63] Continuation of Ser. No. 410,109, Sep. 20, 1989, abandoned, and a continuation-in-part of Ser. No. 238,534, Aug. 31, 1988, abandoned, Ser. No. 892,718, May 29, 1992, abandoned, and Ser. No. 94,920, Jul. 22, 1993, Pat. No. 5,321,845.

[30] Foreign Application Priority Data

Sep. 20, 1988 [JP] Japan .................................. 63-235919
Sep. 20, 1988 [JP] Japan .................................. 63-235920

[51] Int. Cl.$^6$ .............................. G06F 9/24; G06F 9/312; G06F 13/40; G06F 15/20
[52] U.S. Cl. .................. 395/800; 364/221.7; 364/228.5; 364/229.5; 364/230.5; 364/231.6; 364/232.8; 364/232.9; 364/238.9; 364/239.5; 364/240.7; 364/245.9; 364/246.92; 364/254.8; 364/267.8; 364/269.3; 364/DIG. 1; 364/DIG. 2; 364/242.91; 395/180; 371/22.2
[58] Field of Search ..................................... 395/325, 800, 395/400, 425, 575, 275, 775, 250, 725, 200, 500; 364/DIG. 1, DIG. 2, 132; 365/201, 185, 230.05, 218, 228, 222; 235/451; 340/825.07, 825.52, 825.86, 825.03

[56] References Cited

U.S. PATENT DOCUMENTS

| | | | |
|---|---|---|---|
| 4,482,953 | 11/1984 | Burke | 395/325 |
| 4,675,513 | 6/1987 | Kuze | 365/201 |
| 4,713,792 | 12/1987 | Hartmann et al. | 395/425 |
| 4,783,764 | 11/1988 | Tsuchiya et al. | 365/185 |
| 4,794,558 | 12/1988 | Thompson | 395/800 |
| 4,802,119 | 1/1989 | Heene et al. | 395/400 |

(List continued on next page.)

FOREIGN PATENT DOCUMENTS

| | | |
|---|---|---|
| 0306962A2 | 5/1995 | European Pat. Off. . |
| 60-198667 | 3/1986 | Japan . |
| 61-285567 | 5/1987 | Japan . |

OTHER PUBLICATIONS

Goss, "Single Chip Microcomputer with EPROM Allows Flexible System Design", WESCON, V. 27, 1983, pp. 34/2 (1–4).

McMorrow, "In–Circuit Logic Device Can be Reprogrammed on the Fly", Electronic Design Exclusive, Aug. 7, 1986, pp. 94–97.

Primary Examiner—Daniel H. Pan
Attorney, Agent, or Firm—Fay, Sharpe, Beall, Fagan, Minnich & McKee

[57] ABSTRACT

In developing the function of a data processing system using a semiconductor integrated circuit for data processing, comprising a non-volatile logical function block to which data is written electrically and a logical operation block utilizing the logical function block to execute the logic operation, data corresponding to the required specification and function of the system is written in the logical function block. Thereby, flexibility is obtained for setting and changing the required function to the semiconductor integrated circuit. The semiconductor integrated circuit also has an operation specification written to the logical block by a writing device designed to write to a non-volatile semiconductor storage device thereby improving the convenience of setting the functions required of the semiconductor integrated circuit.

14 Claims, 15 Drawing Sheets

U.S. PATENT DOCUMENTS

| | | | |
|---|---|---|---|
| 4,807,114 | 2/1989 | Itoh | 395/800 |
| 4,905,140 | 2/1990 | Sakakibara et al. | 395/425 |
| 4,935,734 | 6/1990 | Austin | 340/825.23 |
| 4,969,121 | 11/1990 | Chan et al. | 395/325 |
| 4,989,185 | 1/1991 | Matsuo et al. | 365/185 |
| 4,992,680 | 2/1991 | Benedetti et al. | 326/41 |
| 5,109,359 | 4/1992 | Sakakibara et al. | 395/185 |

METHOD FOR FLEXIBLY DEVELOPING A DATA PROCESSING SYSTEM COMPRISING REWRITING INSTRUCTIONS IN NON-VOLATILE MEMORY ELEMENTS AFTER FUNCTION CHECK INDICATES FAILURE OF REQUIRED FUNCTIONS

This application is a continuation application of U.S. Ser. No. 07/410,109, filed Sep. 20, 1989, now abandoned and a continuation-in-part application of U.S. Ser. No. 07/238,534, filed Aug. 31, 1988, abandoned, U.S. Ser. No. 07/892,718, filed May 29, 1992, abandoned, and U.S. Ser. No. 08/094,920, filed Jul. 22, 1993, U.S. Pat. No. 5,321,845.

BACKGROUND OF THE INVENTION

The present invention relates to a method and apparatus for the flexible development of a data processing system such as a microcomputer system and also to a semiconductor integrated circuit for data processing. The present invention relates to effective technology to be applied to a development method of a single chip microcomputer system and further to a single chip microcomputer applied to the present method.

In a microcomputer system formed on a wiring substrate with a single chip microcomputer as a key component having a CPU (central processing unit) at the center and required peripheral circuits formed on one semiconductor substrate, an exclusive LSI, a programmable device such as a PAL (programmable array logic) or a PLD (programmable logic device), and a TTL circuit or the like are installed. This hardware is used for data storage and data communication and for motor drive control as well as display control corresponding to the control object. When such a microcomputer application system is developed, to change or debug the software program, the memory holding the program must be corrected. In a single chip microcomputer incorporating a memory being the object of correction or change converting the memory into EPROM and enabling its writing control based on signal control from the outside is disclosed in Japanese patent application laid-open No. 198667/1985.

When a microcomputer application system with an external logic constituted on the outside of the single chip microcomputer needs to be changed, a very complex and time consuming procedure is involved. If correction of the hardware becomes necessary attendant upon a change of the operation specification or function of the system midway through development, a change of the program of the programmable device such as the external logic and reconstruction of the LSI by change of a mask pattern in the case of a hardware constituted by a gate array and a further change of wiring pattern in the wiring substrate becomes necessary. Therefore, measuring the change of the operation specification and the function of the system midway through the development of the microcomputer application system is delayed.

On the other hand, as microcomputer application systems become multifunctional and are further miniaturized data processing LSI such as a single chip microcomputer with various sorts of peripheral functions being on-chip is apt to be increasingly applied. Corresponding to this, the single chip microcomputer incorporates various sorts of peripheral functions which can be constituted as an external memory or an external logic, such as an interface circuit, a timer counter, an input/output control circuit, a ROM for storing the control program and a subprocessor on one semiconductor substrate. However, since the peripheral function incorporated in such a single chip microcomputer particularly a logic functional portion in hardware is fixed conventionally, although the program memory converted into EPROM can change the software program, in order to change the logic function in hardware, design change of the single chip microcomputer as a whole and the change of the mask pattern for the manufacturing must be performed, thereby existence of a problem has been made clear. Specifically, a user of the single chip microcomputer cannot himself set or change the operation specification or the function required in the logic functional portion in the hardware. Further, when the system having such single chip microcomputer as the key component is constituted even if only a partial change of the operation specification and the function of the system becomes necessary, the function of the single chip microcomputer cannot be dealt with flexibly and rapidly in response to the requirement. This problem also suppresses the multifunctional conversion of the single chip microcomputer.

SUMMARY OF THE INVENTION

An object of the present invention is to provide a development method for developing a data processing system wherein setting and changing the operation specification and function of the data processing system can be accomplished with a high degree of flexibility and ease.

A further object of the present invention is to provide a semiconductor integrated circuit for data processing to deal simply with setting and changing the operation specification and function of the data processing system.

More specifically it is to provide a semiconductor integrated circuit having a logic functional block including a non-volatile storage element wherein the convenience with respect to the process of writing to these non-volatile storage elements can be improved.

The foregoing and other objects and novel features of the invention will become apparent from the description of the specification and the accompanying drawings.

DEVELOPMENT METHOD FOR A DATA PROCESSING SYSTEM

When a data processing system is constructed having a semiconductor integrated circuit for data processing composed of a logic functional block which can realize a required logic function in response to the writing state for a non-volatile storage element and of a logic operation control block such as a CPU block which realizes the logic operation utilizing the logic functional block, required data is written to the non-volatile storage element included in the logic functional block.

Then in response to a change of the operation specification and function of the data processing system, a step of rewriting the non-volatile storage element or a step of implementing a new semiconductor integrated circuit for data processing with the same structure reflected to the storage information of the logic circuit block may be included. Otherwise, the step of writing a software program in response to a function required for the data processing system into the non-volatile memory block the step of erasing and rewriting the information of the non-volatile storage element included in the non-volatile memory block in response to the change of the function of the data processing system, or the step of implementing the changed function with a new semiconductor integrated circuit for data processing with the same structure reflected to the storage information of the non-volatile memory block may be included.

According to such a development method, when the data processing system is developed in order to set or change the function of the semiconductor integrated circuit in response to the required specification of the system, the logic function set in the hardware of the logical function block and the information of the non-volatile memory block are programmed electrically so as to satisfy the required specification of the function, thereby the setting or changing of the operation specification or function required for the system can be accomplished with a high degree of flexibility and ease.

SEMICONDUCTOR INTEGRATED CIRCUIT FOR DATA PROCESSING

A semiconductor integrated circuit for data processing is composed of a logical function block which can realize a required logic block function in response to the writing state for a non-volatile storage element, or a non-volatile memory block including a non-volatile storage element which can write a software program electrically, as well as of a logical operation control block such as a CPU whose operation is constituted by software programs. Such a circuit is provided with the operation specifications in such a manner that the non-volatile storage element of the logical function block and the non-volatile memory block can be written to from outside the circuit by a writing device such as a general EPROM writer.

Such operation specifications may be, for example, that the semiconductor integrated circuit for data processing can be made to function in a manner similar to the non-volatile single memory by a mode signal, i.e., that the external terminal to enable interfacing with a writing device such as a general EPROM writer can be seen. When such an operation specification is adopted, using an adapter such as a socket adapter with simple constitution so as to exclusively change differences in the number of external terminals and the arrangement between the semiconductor integrated circuit for data processing and the general writing device, both can be interfaced with each other.

The logical function block and the non-volatile memory block of the system are commonly connected to an internal address bus and an internal data bus, or the writing device and external data or address access terminals to be interfaced therewith are made common between the logical function block and the non-volatile memory block and both blocks being arranged in the same address space. Consequently when the logical function block or the non-volatile memory block is written to from the outside by the writing device, special processing or circuitry is not required for changing the address space. Rather, this can be accomplished by simply changing the address signal. This information can be written in the writing device common to both the logical function block and the non-volatile block.

According to the semiconductor integrated circuit of the present invention, the operation specification that the non-volatile storage elements of the logical function block and the non-volatile memory block can be written from the outside by the writing device entirely obviates utilization of a special exclusive writing device in setting or changing the operation specification or the function of the semiconductor integrated circuit for data processing. Consequently, during mass production of the semiconductor integrated circuit and further at the debug or development stage of system development applying this invention causes the convenience to the semiconductor integrated circuit for data processing to be improved at the point of setting of the logic function to the semiconductor integrated circuit. In other words, the ease with which writing to the non-volatile storage element included in the logical function block or the non-volatile memory block is improved.

DESCRIPTION OF THE PREFERRED EMBODIMENTS

Figure 1:
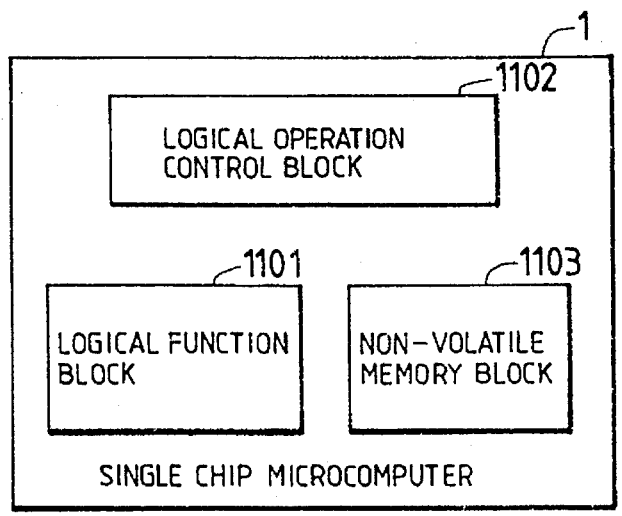
FIG. 1 is a block diagram of an embodiment of a semiconductor integrated circuit for data processing according to the invention.

FIG. 1 shows a single chip microcomputer comprising a semiconductor integrated circuit for data processing according to a preferred embodiment of the present invention. The single chip microcomputer 1 shown in FIG. 1 is formed on one semiconductor substrate by known semiconductor manufacturing technology, and comprises at least (1) a logical function block 1101 for realizing required logical functions in response to the writing states for a non-volatile storage element capable of being written electrically, (2) a logical operation control block 1102 such as a CPU for executing the logical operation utilizing the logical function block 1101, and further, if necessary, (3) a non-volatile memory block 1103 which can store an operation program or the like for the logical operation control block into the non-volatile storage element wherein the program is capable of being written electrically.

Figure 4:
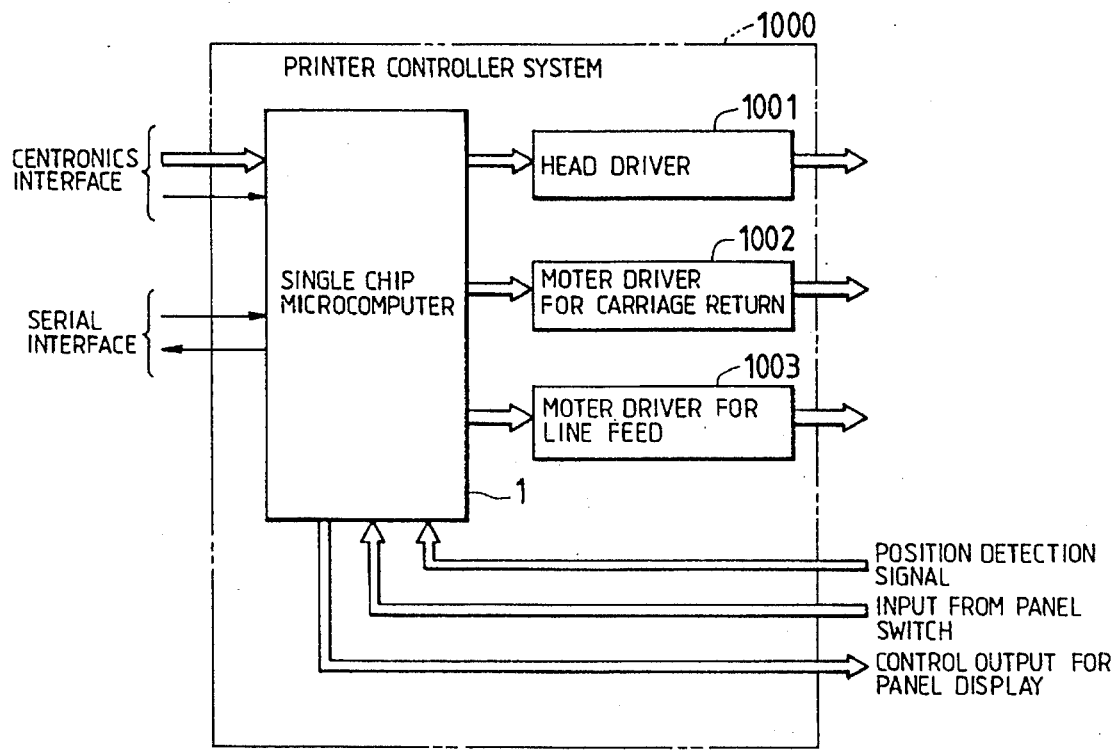
FIG. 4 is a block diagram of an example of a printer controller system constituted by the procedure shown in FIG. 3.

Such a single chip microcomputer 1 can be applied to various sorts of microcomputer application systems such as a printer controller system 1000 shown in FIG. 4. For example, the printer controller system 1000 shown in FIG. 4 controls a mechanical portion of the printer while interfacing with a host computer, and centers around the single chip microcomputer 1. The printer controller system 1000 also includes a head driver 1001 for driving, for example, dots of a dot printer head in accordance with printing data, a motor driver 1002 for carriage return for moving the printer head in the printing direction, and a motor driver 1003 for line feeding to move a medium such as paper to be printed.

The single chip microcomputer 1 receives printing data from the host computer through a parallel interface or a serial interface, and controls the head driver 1001 in response to the printing data. The motor driver 1002 used for carriage returns and the motor driver 1003 used for line feeding during the printing operation are driven and controlled based on an output of a timer included in the single chip microcomputer 1, a position detection signal detected by a mechanical portion of the printer, and input from a panel switch. The printing data supplied to the head driver 1001 may be supplied through an LSI such as an interface adapter based on data or address outputted from the single chip microcomputer 1. The position detection from the outside, the panel switch input and, the control output for panel display may be transmitted or received through an LSI such as an interface adapter. The printer controller system 1000 may be provided with an expanded RAM which can be accessed by the single chip microcomputer 1.

Figure 3:
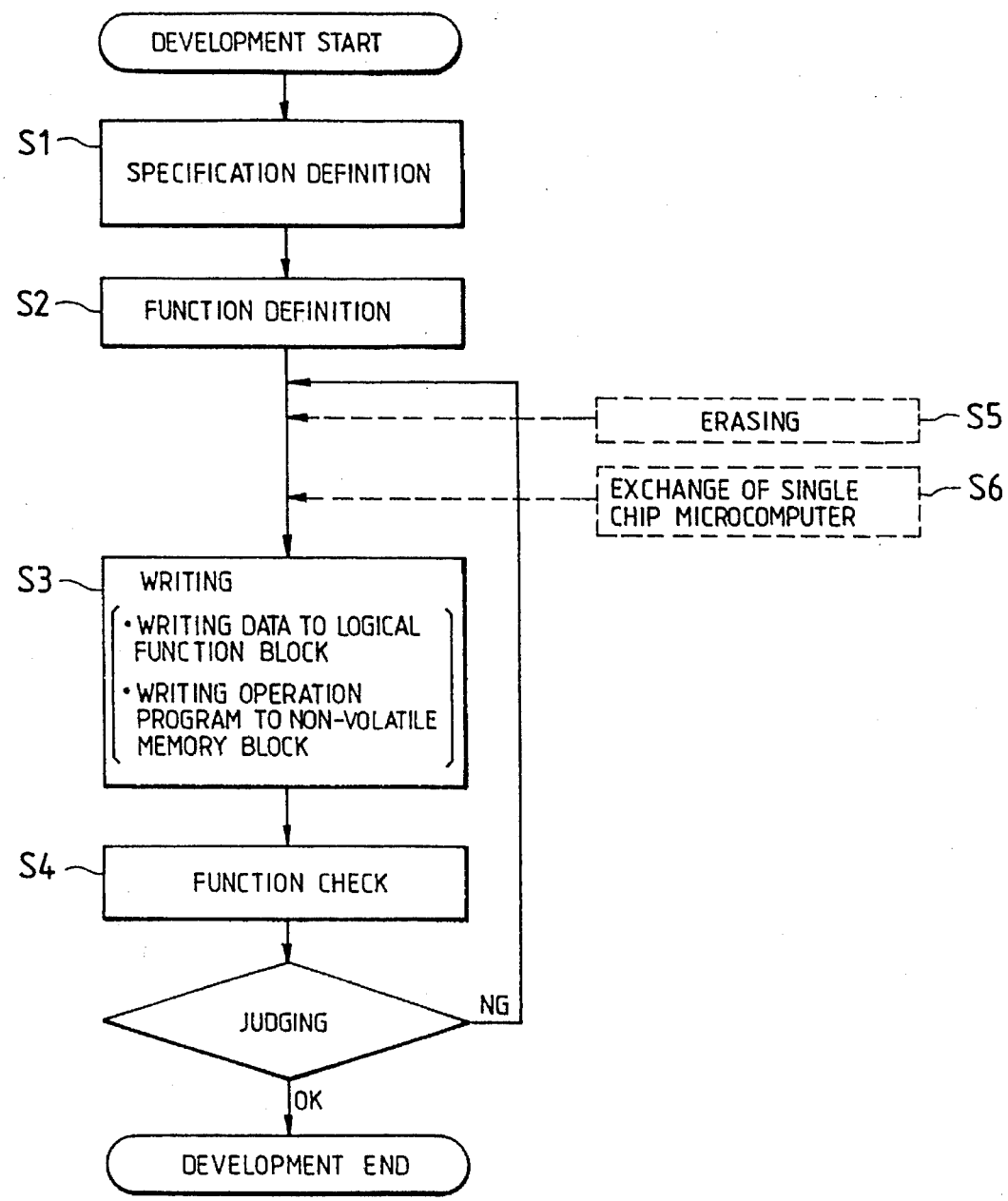
FIG. 3 is a flow chart of an embodiment illustrating a procedure for a development method of a data processing system according to the invention.

FIG. 3 shows an example of a procedure for developing the microcomputer application system such as the printer controller system 1000 using the single chip microcomputer 1.

To develop the system, the first step is to define the required specifications of the system (step S1). Next, the functions of a single chip microcomputer 1 are defined that are required to accomplish the system specifications (step S2). In order that the specifications defined in this manner can be accomplished by the single chip microcomputer 1, the required information is written in a logical function block 1101 and/or a non-volatile memory block 1103 (step S3). Data to set the required logic function is written in the logical function block 1101. An operation program for the operational control block 1102 which uses the logical function set to the logical function block 1101 and function of other circuit blocks is written in the non-volatile memory block 1103. Since the single chip microcomputer 1 may not include the non-volatile memory block 1103, the operation program is supplied by a separate chip.

After the function of the single chip microcomputer 1 is set by writing the data, a function check of the single chip microcomputer 1 is performed by system debug or the like (step S4). As a result of the function check, if the intended specification or function is satisfied, the development of the required system is finished. That is, the function necessary to control the required microcomputer application system such as the printer controller system 1000 is embodied in the single chip microcomputer, and the development of the system is finished. If anything unsatisfactory exists as a result of the function check, a result of the system debug or the like is utilized and the process is returned to the step of writing the data again so that the unsatisfactory situation is improved. In this case, if the logical function block 1101 and/or the non-volatile memory block 1103 are comprised of non-volatile storage elements (EEPROM electrically erasable read-only memory) capable of being rewritten electrically, the portion to be corrected is rewritten with new information. Also if they are comprised of non-volatile storage elements (EPROM electrically programmable ROM) where data can be erased by irradiating ultraviolet rays, all bits of information are erased by the ultraviolet rays (step S5), and the writing is performed from the beginning. In this case, if the single chip microcomputer 1 is not enclosed in a package with a window for irradiating ultraviolet rays, the single chip microcomputer 1 itself is exchanged by a new one (step S6), and the writing is performed from the beginning.

While not being limited to, the single chip microcomputer 1 of the embodiment utilizes a writing device such as a general EPROM writer for a non-volatile semiconductor storage device such as EPROM or EEPROM, and has the operation specification such that the logical function block 1101 and/or the non-volatile memory block 103 can be written to from the outside.

For example, the operation specification, although not particularly limited thereto, is that if the writing operation is commanded from the mode terminal, the prescribed external terminal functions as an access terminal for non-volatile storage elements of the logical function block 1101 and/or the non-volatile memory block 1103. According to the operation specification, the single chip microcomputer 1 is made equivalent to the non-volatile semiconductor storage device capable of being written to from the general EPROM writer, thereby the setting and further change of the function of the single chip microcomputer 1 is accomplished with great ease.

Figure 2:
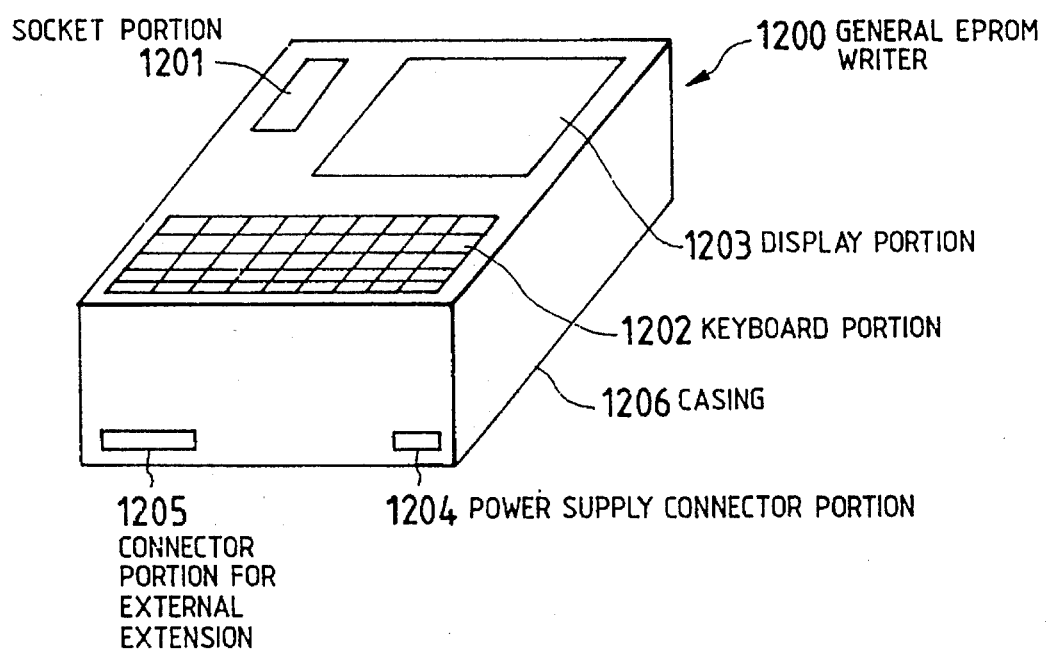
FIG. 2 is an appearance view of an example of a general writing device.

FIG. 2 shows a general EPROM writer 1200. The general EPROM writer 1200, although not particularly limited thereto, comprises a socket portion 1201 for installing a semiconductor integrated circuit which is to be written to a keyboard portion 1202 for assigning the operation mode in response to non-volatile storage elements and inputting the data to be written, a display portion 1203 for displaying the input state and the operation state from the keyboard portion 1202, a power supply connector portion 1204, and a connector portion 1205 for external extension capable of being connected to other devices by a serial interface or the like. All portions are arranged on the outside of a casing 1206, and a control circuit for performing, writing or rewriting in accordance with the command of the keyboard 1202 or the like is included on the inside.

When the single chip microcomputer 1 is installed to such a general EPROM writer 1200, if the external terminal of the single chip microcomputer 1 as it is cannot be interfaced with the socket portion 1201, an adapter for connecting the external terminals assigned as the access terminal for non-volatile storage elements of the logical function block 1101 and/or the non-volatile memory block 1103 to the socket portion 1201 may be utilized.

Now, the single chip microcomputer 1 and development method of a microcomputer application system utilizing it will be described in greater detail.

Figure 5:
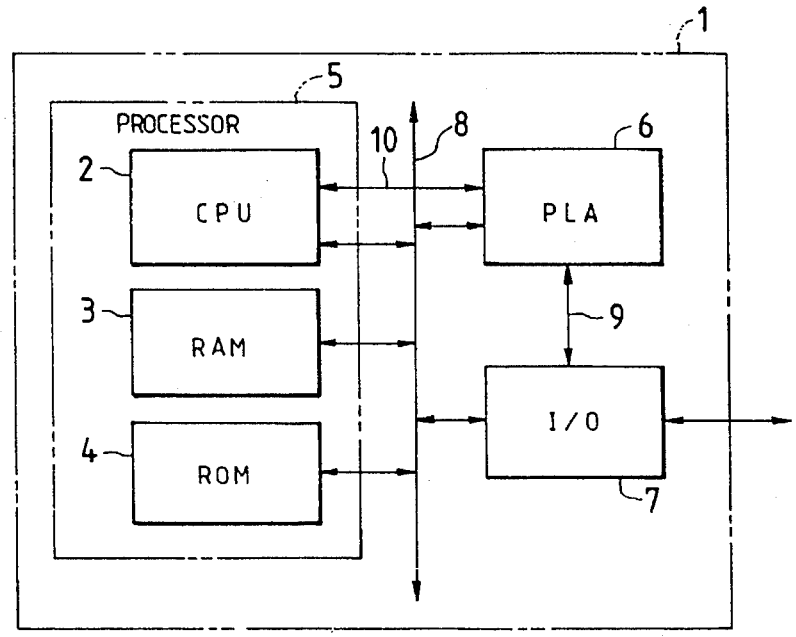
FIG. 5 is a block diagram of an embodiment of a single chip microcomputer.

FIG. 5 shows a more detailed example of the single chip microcomputer 1 shown in FIG. 1. The single chip microcomputer 1 shown in FIG. 5 is comprised of a processor 5 comprising a CPU (central processing unit) 2 as an example of a logical operation control block, a RAM (random access memory) 3 and a ROM (read only memory) 4, a PLA (programmable logic array) 6 as an example of a logical function block having variable logic structure, and an input/output port (simply referred to as I/O) 7. The respective blocks are connected by a common bus 8. The PLA 6 is connected directly to the I/O 7 and the CPU 2 by signal lines 9, 10.

The ROM 4 serves to store the operation program as software of the single chip microcomputer 1, and the PLA 6 being programmable and include a non-volatile storage element is made a logical function block to realize a part of hardware of the single chip microcomputer 1.

Figure 6:
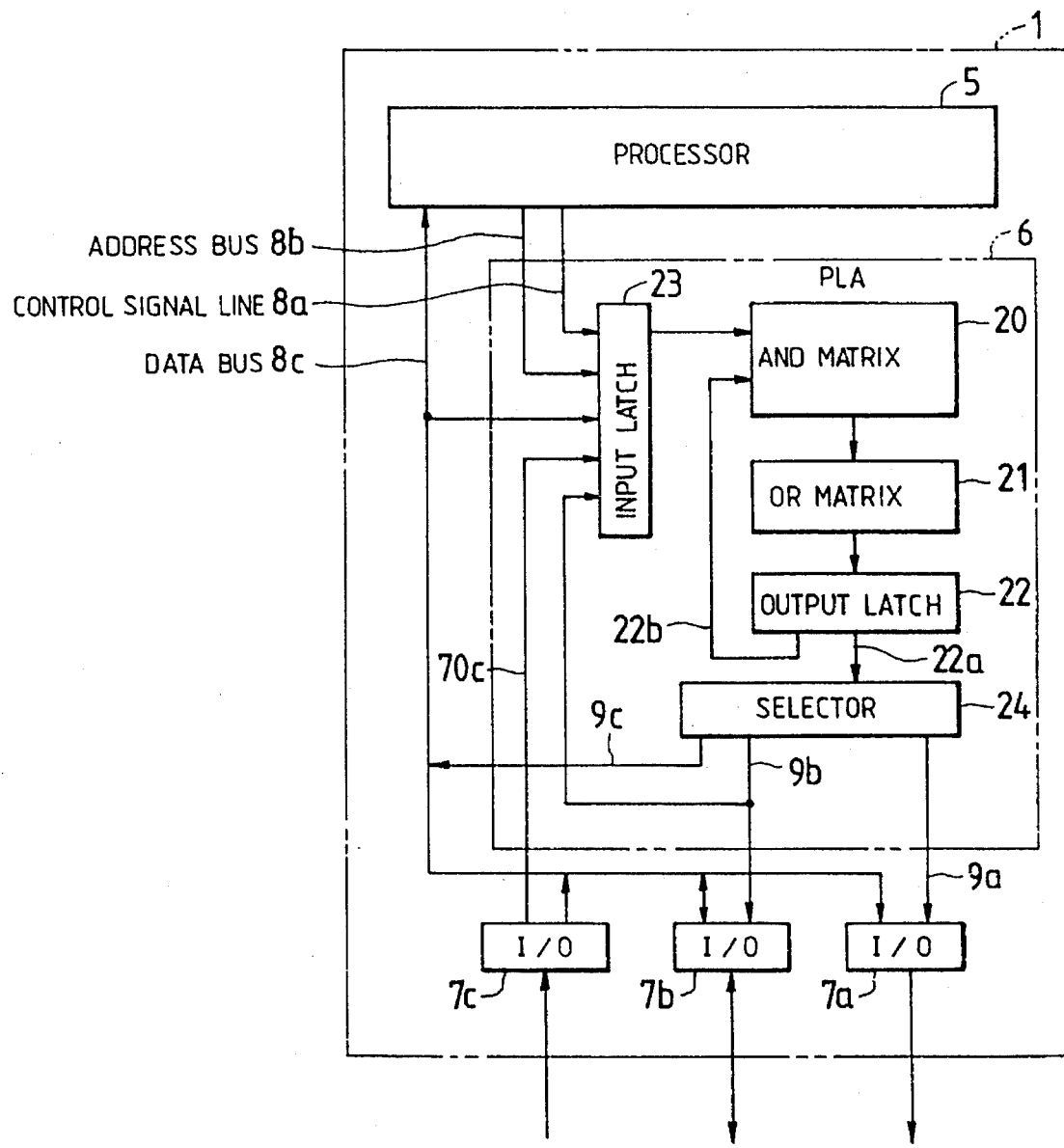
FIG. 6 is a block diagram of another single chip microcomputer more particularly illustrating a PLA as an example of a logical function block.

FIG. 6 shows a more detailed example of the single chip microcomputer 1 of FIG. 5 centering around the PLA 6.

The PLA 6 is comprised of an AND matrix 20, an OR matrix 21, an output latch 22, an input latch 23, and a selector 24, and also wiring connecting between respective circuits. Connection between the processor 5 and the PAL 6 is performed by a control signal line 8a, an address bus 8b and a data bus 8c so that signals generated by the processor 5 are inputted to the input latch 23 of the PLA 6. Interface of the single chip microcomputer 1 with the outside is performed by an output port 7a, an input/output port 7b and an input port 7c all connected to the data bus 8c. Input to the input latch 23 of the PLA 6 is generated through 70c, the control signal line 8a, the address bus 8b, the data bus 8c, the input port 7c, and output 9c of the output selector 24. The output of the input latch 23 is supplied to the AND matrix 20. Output of the AND matrix 20 is input to the OR matrix 21, and the output of the OR matrix 21 is supplied to the output latch 22. Output 22a of the output latch 22 is supplied to the selector 24, and partial signal 22b thereof is input to the AND matrix 20. Among outputs of the selector 24, outputs 9a, 9b are made inputs of the output port 7a and the input/output port 7b respectively, and output 9c is connected to the data bus 8c.

Figure 7:
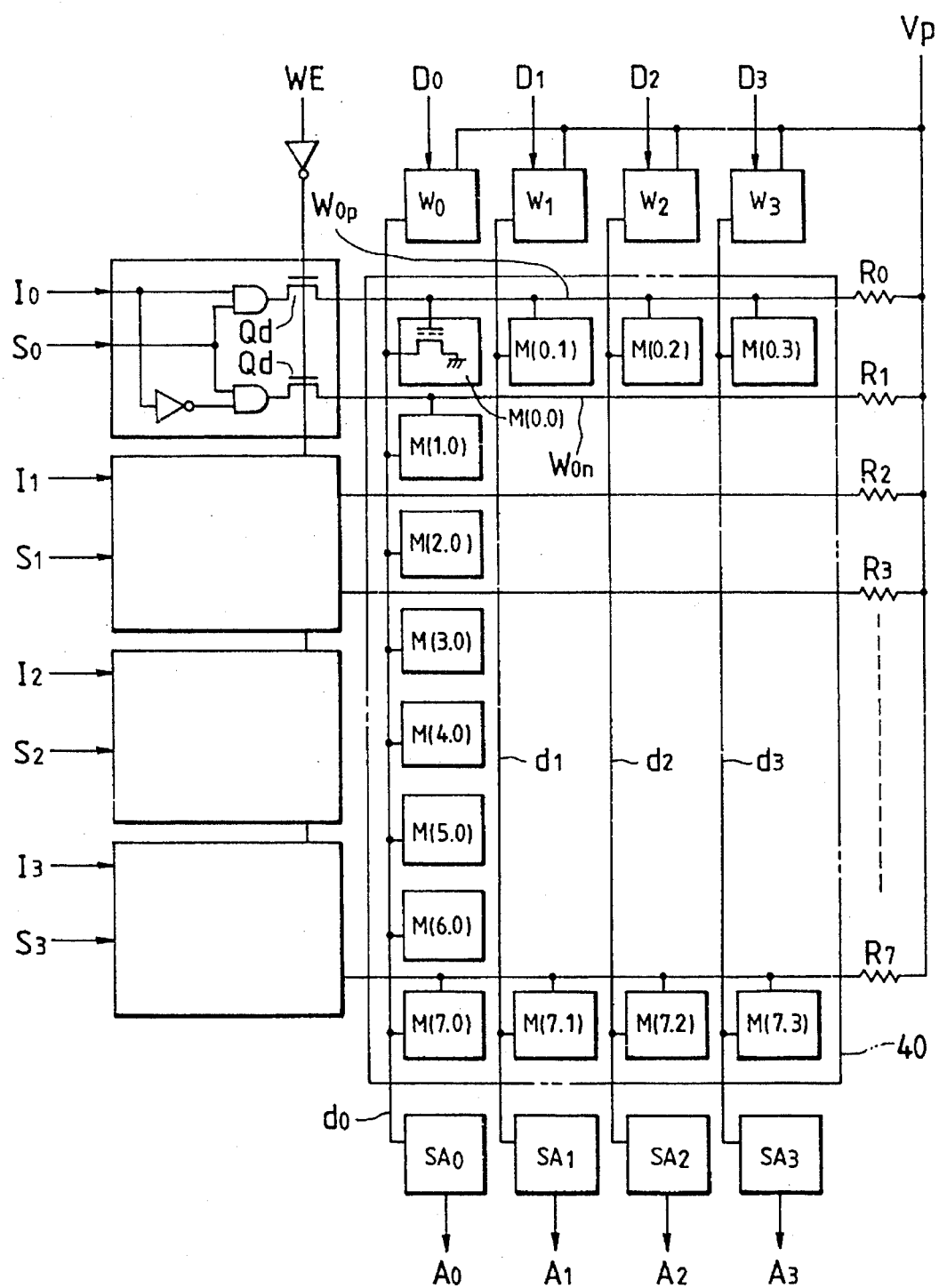
FIG. 7 is a circuit diagram showing an example of an AND matrix in the PLA of FIG. 6.

FIG. 7 shows an example of the AND matrix 20. The AND matrix 20, although not particularly limited thereto, includes non-volatile storage elements constituting an EPROM (electrically programmable read only memory) of an ultraviolet ray erasing type having channel injection structure capable of being written electrically. The AND matrix 20 is constructed to obtain four independent AND outputs (A0–A3) to four inputs (I0–I3). The AND matrix 20 includes a memory array cell 40 consisting of the matrix arrangement of the non-volatile storage elements M(O,O) M(7,3) in eight rows and four columns.

Since the construction of non-volatile storage elements constituting the EPROM is already known in the art, detailed description of such shall be omitted. However, the threshold low level voltage of the non-volatile storage element which is about 1[V], shall be defined as the erasing state, and a high level of about 5[V] shall be defined as the writing state.

Writing to the non-volatile storage elements is performed at every four bits in row unit. That is, the writing data is supplied to writing terminals Do–D3, and one of selecting lines So–S3 is selected. The writing voltage (for example, 12.5[V]) is supplied to a writing terminal Vp. In this case, depending on the state of inputs I0–I3, it is determined whether positive logic or negative logic should be written.

In the input I0 for example, when the input I0 is made high, the word line Wop is selected, and when the input I0 is made low, the word line Won is selected. The writing voltage is supplied through a resistor Rj (j=0–7) to the gate electrode of the non-volatile storage element where the gate electrode is connected to the selected word line. Voltage converting circuits W0–W3 receiving the writing data from the writing terminals D0–D3 generate the drain voltage required for the writing when the writing data level is high level, and supply it to the data lines d0–d3 respectively. Thereby non-volatile storage elements with the erasing state as their initial state are made the writing state when the word line is selected and the writing data of a high level is supplied, while others maintain the erasing state.

According to such a writing operation, the program of the non-volatile storage elements M(0,0)–M(7,3) included in the memory cell array 40 is performed.

When the programmed AND matrix 20 performs its logic operations, the writing terminal Vp is supplied with the power source voltage of the circuit (or the ground potential), the writing signal WE is set to a low level and all signals S0–S3 are set to high levels. The word line is selected in accordance with the level of the inputs I0–I3, and the data level corresponding to the program state of the non-volatile storage elements. The gate electrode connected to the selected word line is detected through the data lines d0–d3 in sense amplifiers SA0–SA3. As a result, the AND outputs A0–A3 can be obtained from the sense amplifiers SA0–SA3. MOSFET Qd in FIG. 7 is a depletion type MOSFET.

Figure 8:
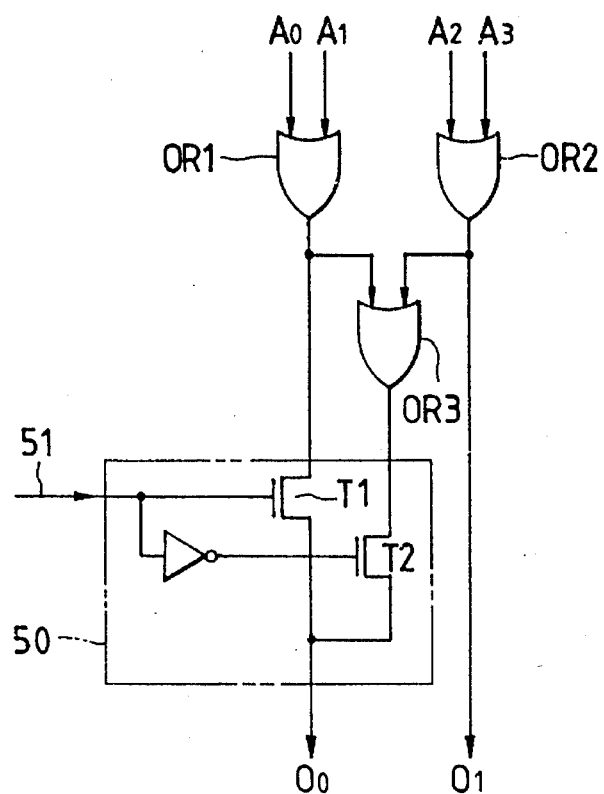
FIG. 8 is a circuit diagram of an example of an OR matrix in the PLA of FIG. 6.

FIG. 8 shows an example of the OR matrix 21 included in FIG. 6. The OR matrix 21 is formed having an OR circuit OR1 with its two inputs being the AND outputs A0, A1, an OR circuit OR2 with its two inputs being the AND outputs A2, A3, an OR circuit OR3 with its two inputs being outputs of the OR circuits OR1, OR2, and an output for the selecting circuit 50 to thereby select outputs of circuit OR1 and circuit OR3.

If input signal 51 of the selecting circuit 50 is made high, a transistor T1 is turned on and a transistor T2 is turned off, and the OR matrix 21 obtains AND outputs 00, 01 shown in following logical expressions.

O0=A0+A1

O1=A2+A3

If the input signal 51 of the selecting circuit 50 is made low, the transistor T1 is turned off and the transistor T2 is turned on, and the OR matrix 21 obtains AND outputs OO, O1 shown in following logical expressions.

O0=A0+A1+A2+A3

O1=A2+A3

The single chip microcomputer 1 shown in FIG. 6 performs exchange control of the input latch 23 and the selector 24 and therefore can be operated in modes shown in FIG. 9A through FIG. 9D.

Figure 9A:
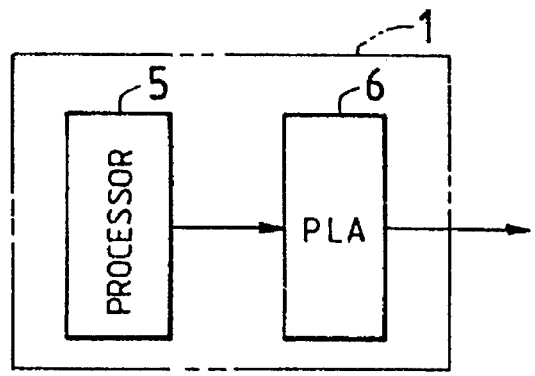
FIGS. 9A through FIG. 9D are operation mode explanation diagrams paying attention to PLA and I/O in the single chip microcomputer shown in FIG. 6.

In the mode shown in FIG. 9A, information is selected from buses 8a–8c as input of the input latch 23 of FIG. 6, and output of the selector 24 is supplied to the ports 7a, 7b, thereby output of the processor 5 is converted in the PLA 6 and then outputted outside of the single chip microcomputer 1.

Figure 9B:
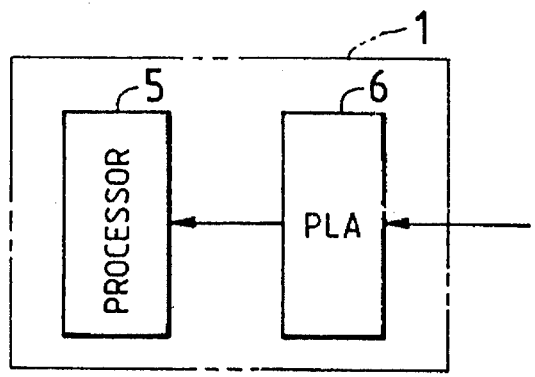

In the mode shown in FIG. 9B, output is selected from ports 7b, 7c as input from the input latch 23, and the output 9c is selected as output of the selector 24, thereby signals supplied from outside of the single chip microcomputer 1 are converted in the PLA 6 and then supplied to the processor 5.

Figure 9C:
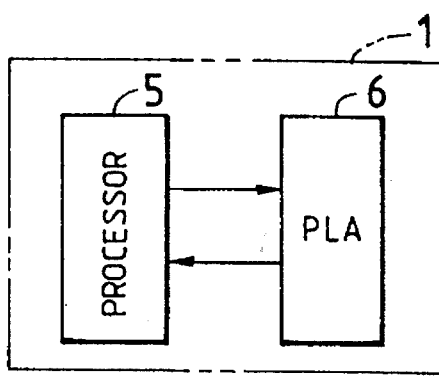

In the mode shown in FIG. 9C, information is selected from the buses 8a 8c as input from the input latch 23, and output of the selector 24 is also supplied to the bus 8c, thereby output of the processor 5 is converted in the PLA 6 and returned again to the processor 5.

Figure 9D:
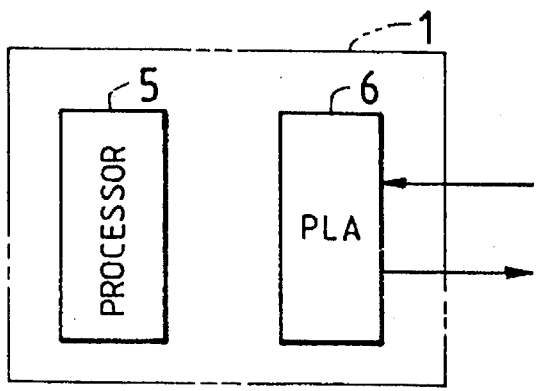

In the mode shown in FIG. 9D, output is selected from the ports 7b, 7c as input from the input latch 23, and output 9a, 9b is selected as output of the selector 24, thereby irrespective of the processor 5, signals supplied from outside of the single chip microcomputer 1 are converted in the PLA 6 and outputted again outside of the single chip microcomputer 1.

Two modes or more among those shown in FIG. 9A through FIG. 9D respectively may be combined. For example, in combination of the modes shown in FIG. 9A and FIG. 9B, input of the PAL 6 is divided, and one is made an output (8a–8c) of the processor 5 and other is made an input (7b, 7c). Output of the PLA 6 is also divided, and one is made an input (8c) of the processor 5 and other is made an output (7a, 7b).

In the single chip microcomputer 1 as described above, in response to the function required of the single chip microcomputer 1 the program state of the non-volatile storage elements is set. For example, when the single chip microcomputer 1 is utilized as the printer controller system 1000 of FIG. 4, required data is written in the non-volatile storage elements of the PAL 6 in response to the required specification of the printer controller system 1000. This operation corresponds to step S3 of FIG. 3.

Also when the single chip microcomputer 1 is enclosed in the package with a window, ultraviolet rays are irradiated from the window and the stored information is erased and then the logical information is newly rewritten. This allows changes of logic or correction of errors of the PLA 6 carrying a part of hardware in the single chip microcomputer 1 to be possible. The single chip microcomputer 1 can therefore deal flexibly with changes in the operation specification and function in the development stage of the application system. Moreover the single chip microcomputer 1 can be utilized repeatedly for such changes. For example, the general EPROM writer 1200 in FIG. 2 can be utilized in writing the data to the PAL 6.

When the microcomputer application system such as the printer controller system 1000 is developed, if the single chip microcomputer 1 is not enclosed in the package with a window, as described in step S6 of FIG. 2, implementing a new single chip microcomputer 1 with other logical information written therein may be performed.

In the non-volatile storage element of the PAL 6, a non-volatile storage element such as a MNOS (metal nitride oxide semiconductor) or a floating gate type EEPROM (electrically erasable and programmable read only memory) capable of being written or erased electrically may be utilized. In this case, the general EPROM writer 1200 can be also utilized.

Figure 10:
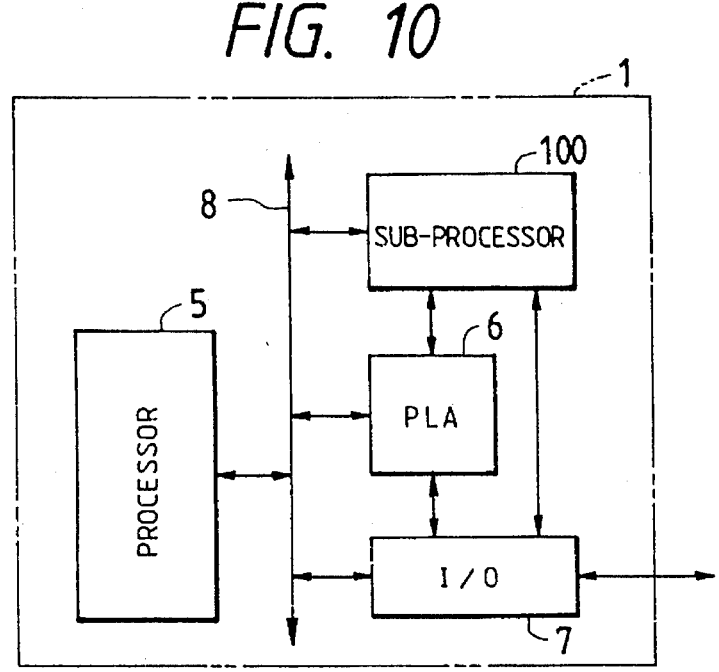
FIG. 10 is a block diagram of an example of a single chip microcomputer having a subprocessor as an example of a logical function block.

Next, as a logical function block of variable logic structure, a single chip microcomputer constituted by adding a programmable logic circuit with a processor structure, i.e. a subprocessor, will be described. The single chip microcomputer 1 as shown in FIG. 10 includes a subprocessor 100 connected to the common bus 8, the PLA 6 and the I/O 7 are also shown.

Figure 11:
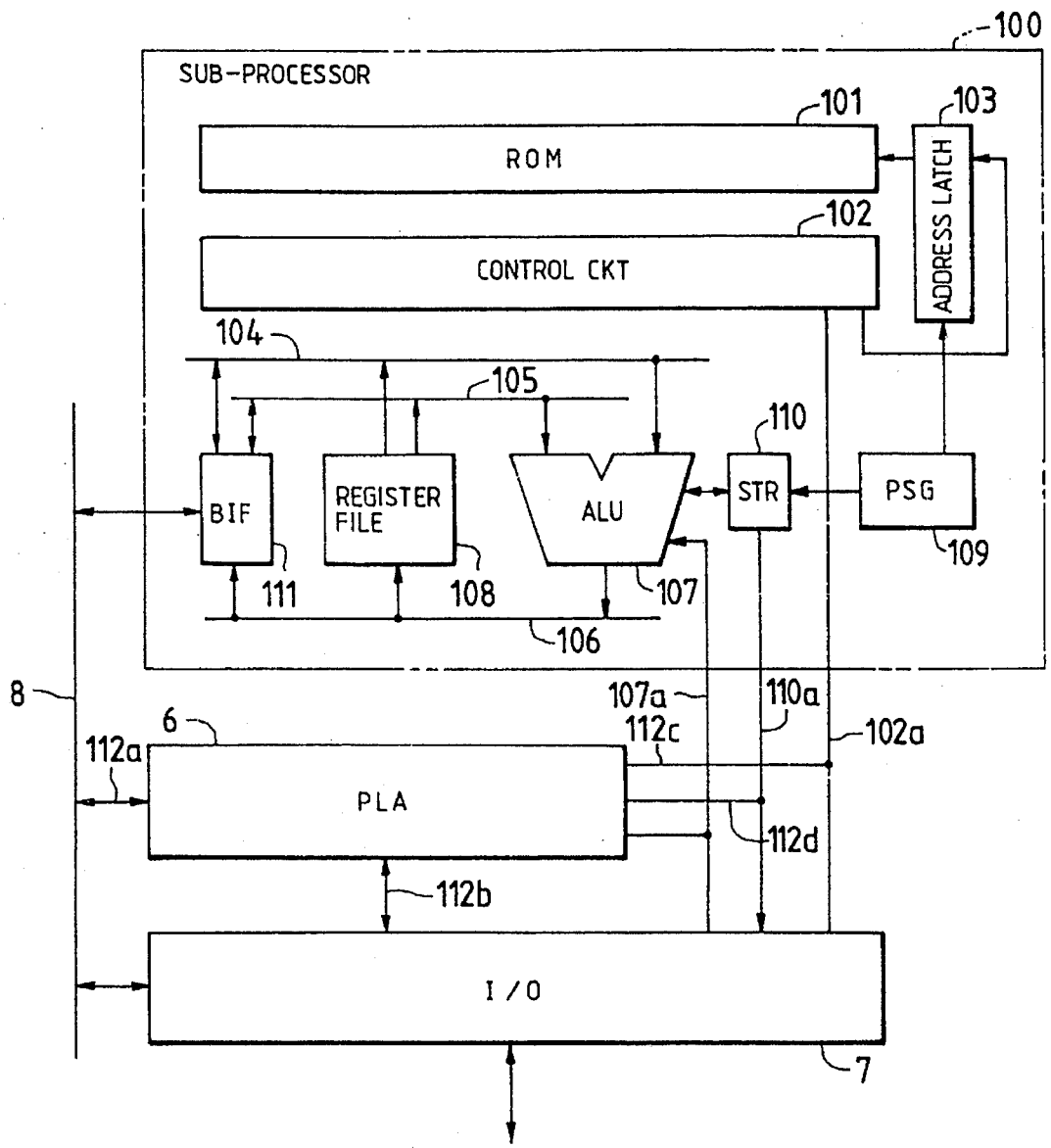
FIG. 11 is a block diagram illustrating an example of the subprocessor shown in FIG. 10.

FIG. 11 shows an example of the subprocessor 100, and the connection between the subprocessor 100, the PLA 6, the I/O 7 and the common bus 8.

The subprocessor 100 includes a ROM 101 for storing instructions, a control circuit 102 for generating control signals based on stored information of the ROM 101, an address latch 103 for holding the next address to access the ROM 101, an ALU (arithmetic and logic unit) 107 connected to first, second and third data buses 104, 105, 106, a register file 108, a PSG (programmable sequential generator) 109, a STR (status register) 110 controlled by the PSG 109, and a BIF (bus interface circuit) 111 connected to the subprocessor 100 by the common bus 8.

The PLA 6 is connected to the common bus 8 by wiring 112a, to the I/O 7 by wiring 112b, to control signal 102a generated in the control circuit 102 of the subprocessor 100 by wiring 112c, to output 110a of the status register 110 by wiring 112d, and to signal 107a which is inputted from I/O 7 and is being sent to the ALU 107.

The PSG 109, the ROM 101 and the PLA 6 are constituted by non-volatile storage elements capable of being written electrically as described above. Consequently in the single chip microcomputer 1, also shown in FIG. 10, the logical arrangement of the non-volatile storage elements included in the PSG 109, the ROM 101 and the PLA 6 is determined in response to the function required in the single chip microcomputer 1. For example, in the case of application to the specific microcomputer application system such as the printer controller system 1000, the logical arrangement is set in accordance with relation to function of the whole system. After ultraviolet rays are irradiated from the window formed on the package of the single chip microcomputer 1 and the stored information is erased, new logic information is rewritten or reloaded electrically to these non-volatile storage elements thus a change of logic or correction of error of the PAL 6, the PAG 109, and the ROM 101 carrying a part of hardware or the logical function in the single chip microcomputer 1 becomes possible. Consequently, the single chip microcomputer 1 can flexibly deal with a change of the specification or function of the whole system during the development stages of the system to which it is applied.

Figure 12:
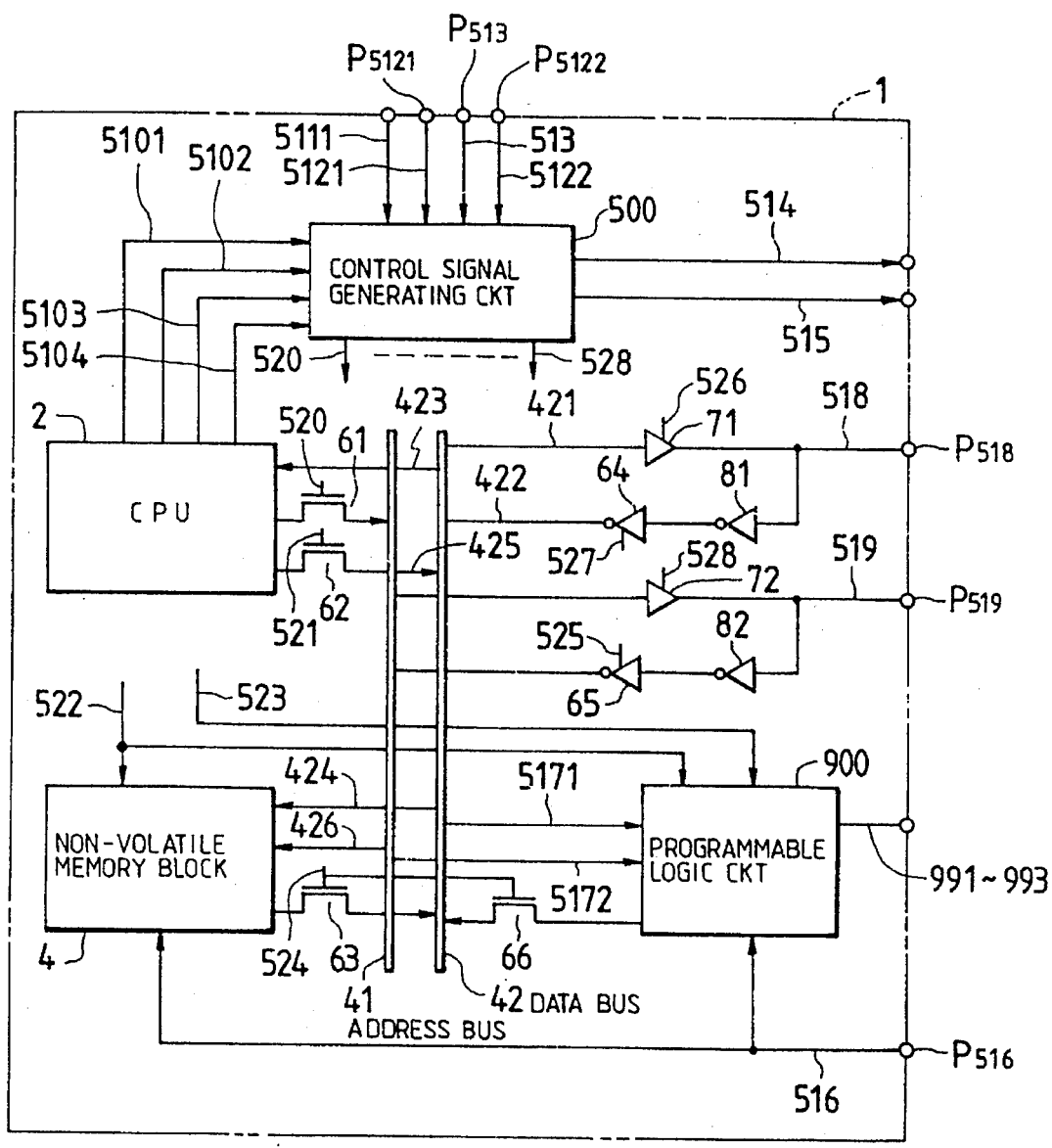
FIG. 12 is a block diagram of an example of a single chip microcomputer having a program memory converted into EPROM as an example of a non-volatile memory block.

FIG. 12 shows an example of the single chip microcomputer 1 where ROM 4 used to store the software program is converted into EPROM and incorporated.

In FIG. 12, the single chip microcomputer 1 comprises a CPU 2, a ROM 4 such as an EPROM, (the ROM 4 being hereinafter referred to also as the non-volatile memory block 4), a control signal generating circuit 500, and a programmable logic circuit 900 as function module to constitute the subprocessor and the PLA.

The CPU 2, the non-volatile memory block 4, the programmable logic circuit 900 and the like are connected to the address bus 41 and the data bus 42. A switch element 61 is interposed between the address bus 41 and the CPU 2, a switch element 62 is interposed between the data bus 42 and the CPU 2, a switch element 63 is interposed between the non-volatile memory block 4 and the data bus 42, and a switch element 66 is interposed between the programmable logic circuit 900 and the data bus 42. The address bus 41 can be interfaced with the outside of the single chip microcomputer 1 by a signal line 519 through a three-state driver 72 functioning as an output bufffer, an invertor 82 functioning as an input buffer and a three-state invertor 65. Additionally, the data bus 42 can be interfaced with the outside of the single chip microcomputer 1 by a signal line 518 through a three-state driver 71 functioning as an output buffer, an invertor 81 functioning as an input bufffer and a three-state invertor 64.

The control signal generating circuit 500 is supplied with control signals 5101–5104 for controlling data transfer from the CPU 2, and with control signals 5111, 5121, 513, 5122 for commanding the operation mode of the single chip microcomputer 1 from the outside of the single chip microcomputer 1. The control signal generating circuit 500 receiving various signals generates control signals 520–528 to control the data transfer timing between the CPU 2, the non-volatile memory block 4, the programmable logic circuit 900, the data bus 42 and the address bus 41 and the signal lines 518, 519. The signals 514, 515 outputted from the control signal generating circuit 500 are signals representing the read cycle and the write cycle to the outside. The non-volatile memory block 4 and the programmable logic circuit 900 are connected to a signal line 516 which supplies the high voltage required for writing non-volatile storage elements.

In the single chip microcomputer 1 shown in FIG. 12, the non-volatile memory block 4 and the programmable logic circuit 900 commonly connected to the data bus 42 and the address bus 41 are arranged in the same address space. Consequently, writing to the non-volatile memory block 4 and the programmable logic circuit 900, does not require special processing circuitry arrangement to change the address space, addresses allocated to respective elements are assigned. Thus the writing and verifying processing to the required non-volatile storage elements included in them can be performed simply by the same control or the same sequence. As a result, the writing device such as the general EPROM writer 1200 can be utilized commonly for both the non-volatile memory block 4 and the programmable logic circuit 900. Additionally, when the incorporated CPU 2 is used, the writing and verifying processing can be performed by the same sequence.

Figure 13:
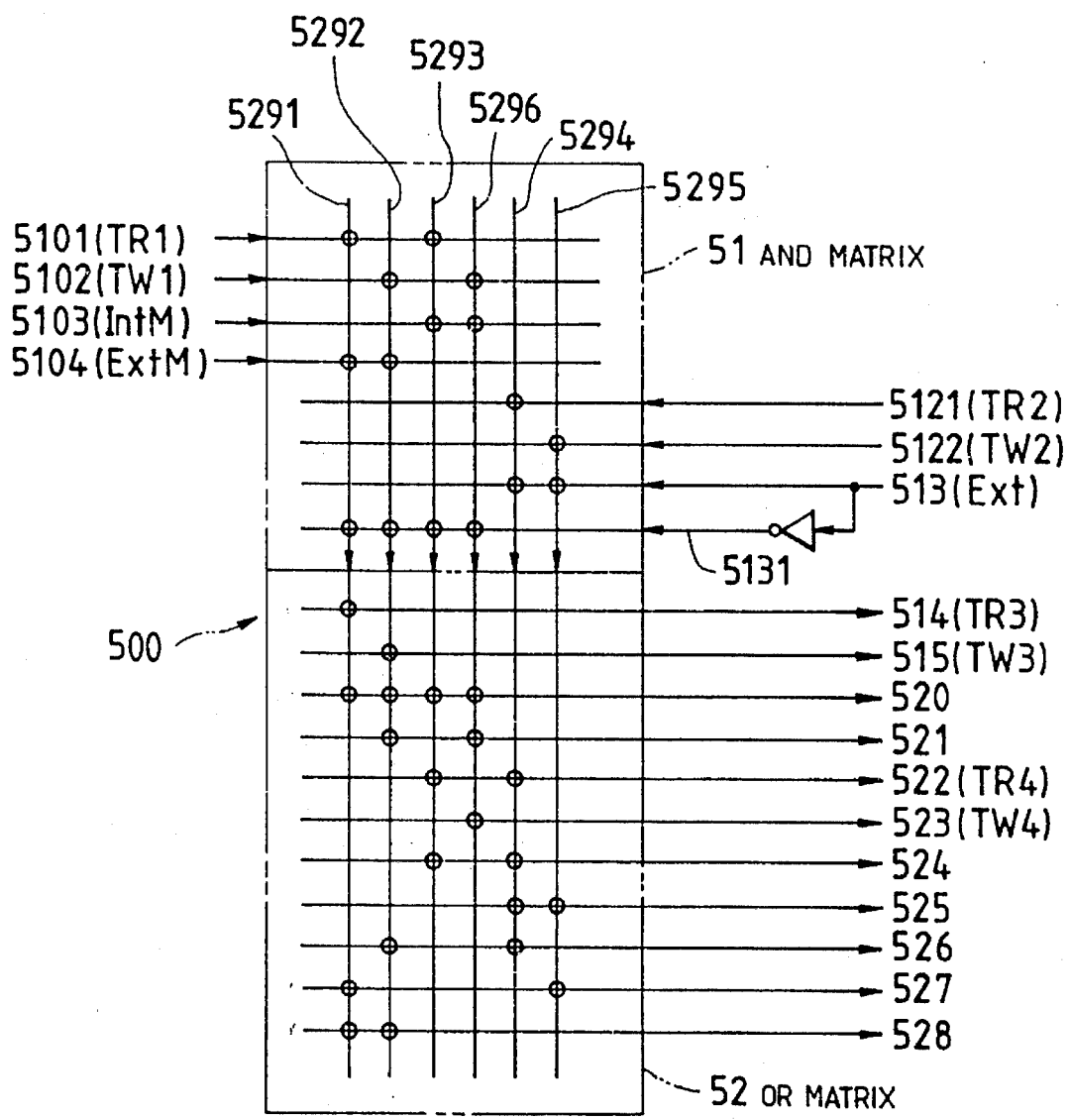
FIG. 13 is a logic diagram of an example of a control signal generating circuit included in the single chip microcomputer of FIG. 12.

FIG. 13 shows an example of the control signal generating circuit 500 shown in FIG. 12. The control signal generating circuit 500, although not particularly limited thereto, is composed of an AND matrix 51 and an OR matrix 52. In the AND matrix 51, six longitudinal signal lines are used as AND output signal lines. Lateral signal lines are disposed to intersect the longitudinal signal lines resulting from the taking of the logical product input to one lateral signal line corresponding to the intersection denoted by symbol 0 to make a corresponding AND output.

For example, inputs of lateral signal lines denoted by symbol 0 which intersect with longitudinal AND output signal lines are all high. Thus outputs of corresponding longitudinal AND output signal lines are made high. The six AND output signal lines in the AND matrix 51 are used as inputs of the OR matrix 52. With regard to lateral OR output signal lines intersecting with the six longitudinal input signal lines, a result of taking the logical sum to an input of the longitudinal input signal line corresponding to intersection denoted by symbol 0 causes an OR output. For example, if any of the inputs of the longitudinal input signal lines denoted by symbol 0 intersect with the lateral OR output signal lines is at a high level, output of the corresponding lateral OR output signal line is made high.

When control signal 513 supplied from the outside is at a low level, the AND output signal lines 5291, 5292, 5293, 5296 receiving the inverted signal 5131 at intersection of symbol 0, the AND output is obtained so that level of the control signals 5101–5104 outputted from the CPU 2 is made effective. In this state, when the control signals 5101 (TR1), 5104 (ExtM) are high, the AND output signal line 5291 becomes high and the external device read mode is set.

In the corresponding operation mode, the control signal 514 (TR3) which sends the read cycle to the outside, is asserted high, and control signals 520, 527, 528 are asserted high. The control signal 520 at a high level controls the switch element 61 to the ON-state and the control signal 528 set at high level controls the three-state driver 72 to enable the output operation. In this manner the address signal sent from the CPU 2 is outputted to the outside through the address bus 41 and the signal line 519.

Data outputted by an externally accessed module (not shown) in response to the address signal and the control signal 514 is supplied to the signal line 518 from the outside. The signal is supplied from the three-state invertor 64, turned on by a high level at control signal 527 to the data bus 42 and is in turn read by the CPU 2.

In the external device read mode, since the control signal 524 is made low, the data taken into the data bus 42 from the outside is not disturbed by the operation of the non-volatile memory block 4 and the programmable logic circuit 900.

When the control signal 513 is at a low level, if the control signals 5102 (TW1), 5104 (ExtM) are made high, the output signal line 5292 becomes high and the external device write mode is set. At the corresponding operation mode, the control signal 515 (TW3) which represents the write cycle to the outside is asserted to a high level, and the control signals 520, 521, 526, 528 are also asserted high. Thus the address signal is outputted from the CPU 2 through the turned on switch element 61. The address signal is then sent to the three-state driver 72 controlled to enable the output operation and onto the signal line 519 as described above. Additionally, the written data outputted from the CPU 2 is supplied through the switch element 62 turned on by a high level at control signal 521. It is then passed onto the data bus 42, and the three-state driver 71 controlled to enable the output operation by the control signal at high level and the signal line 518 to the outside. In this manner, writing to the accessed module on the outside is performed.

When the control signal 513 is at a low level, if the control signals 5101 (TR1), 5103 (IntM) are at high level, the output signal line 5293 becomes high and the internal device reading mode is set. In the corresponding operation mode, the control signals 520, 522 (TR4), 524 are asserted to a high level. Thereby the address signal outputted from the CPU 2 is supplied through the switch element 61 to the address bus 41, and is made the address signal 426 of the non-volatile memory block 4 or the address signal 5172 of the programmable logic circuit 900. At the same time, the reading operation is commanded to the non-volatile memory block 4 and the programmable logic circuit 900 by the control signal 522. In this case, since the non-volatile memory block 4 and the programmable logic circuit 900 are arranged in the same linear address space, even if the address signals are supplied to both, only one of them performs the reading of data in accordance with the address signal. The read data is supplied through any of switch elements 63 and 66 to the data bus 42. The CPU 2 reads the data outputted to the data bus 42 from the signal line 423.

When the control signal 513 is at a low level, if the control signals 5102 (TW1), 5103 (IntM) are at high level, the output signal line 5296 becomes high and the internal device writing mode is set. In the corresponding operation mode, the control signals 520, 521,523 (TW4) are asserted to a high level. Thereby the address signal outputted from the CPU 2 is supplied through the switch element 61 to the address bus 41, and writing data outputted from the CPU 2 is supplied through the switch element 62 to the data bus 42. Additionally, the writing operation is commanded to the programmable logic circuit 900. Thereby data is written in a flip-flop or the like allocated to a required address of the programmable logic circuit 900 which has been assigned by the address signal.

On the other hand, when the control signal 513 is at a high level, the AND output signal lines 5291, 292, 5293, 5296 receiving the inverted signal 5131 at intersections denoted by the symbol 0 are negated to a low level irrespective of the level of the control signals 5101–5104 outputted from the CPU 2. Thus the control signals 520, 521 are controlled normally to a low level, and output data and addressing to the data bus 42 and the address bus 41 by the CPU 2 is made substantially impossible.

That is, the CPU 2 is electrically separated from the address bus 41 and the data bus 42. In this state, if the control signal 5121 (TR2) is made high, the AND output signal line 5294 becomes high and the reading mode is set based on access from the outside. This operation mode is utilized in test reading for verifying after writing by the EPROM writer or the like.

In the corresponding operation mode, the control signals 522 (YR4), 524,525, 526 are asserted to a high level. Thereby the address signal supplied from the outside to the signal line 519 is supplied through the three-state invertor 65 controlled in an operable state by the control signal 525 to the address bus 41, and further supplied from the address bus 41 through the signal lines 426 and 5172 to the non-volatile memory block 4 and the programmable logic circuit 900.

The reading operation is commanded to the non-volatile memory block 4 and the programmable logic circuit 900 by the control signal 522. Data output terminals of the non-volatile memory block 4 and the programmable logic circuit 900 are connected to the data bus 41 by the control signal 524. Consequently, either the non-volatile memory block 4 or the programmable logic circuit 900 performs the reading operation in response to the address signal supplied from the outside, so data required to be read is supplied to the data bus 42. The reading data sent to the data bus 42 is supplied through the three-state driver 71 controlled to enable the output operation by a high level at the control signal 526 to the signal line 518 and is thereafter read to the outside.

When the control signal 513 is at a high level, if the control signal 5122 (TW2) is made high, the output signal line 529 becomes high and the writing mode is set based on access from the outside. This operation mode is utilized in writing by the EPROM writer such as a general EPROM writer 1200.

In the corresponding operation mode, the control signals 525, 527 are asserted to high level. Thereby the address signal supplied from the outside to the signal line 519 is supplied through the three-state invertor 65 controlled in an operable state by the control signal 525 to the address bus 41. The address signal is further supplied from the address bus 41 through the signal lines 426 and 5172 to the non-volatile memory block 4 and the programmable logic circuit 900. Data supplied from the outside to the signal line 518 is supplied through the three-state invertor 64 controlled in an operable state by the control signal 527, to the data bus 42, and is further supplied from the data bus 42 through the signal lines 424 and 5171 to the non-volatile memory block 4 and the programmable logic circuit 900. In this state, if high voltage for writing is supplied from the external terminal to the signal line 516, the writing data is written to non-volatile storage elements in the prescribed address of the non-volatile memory block 4 or the programmable logic circuit 900 assigned by the address signal. The high voltage sufficient for the writing operation is about 10–25 [V], corresponding to the single memory LSI such as an EPROM.

When the non-volatile memory block 4 and the programmable logic circuit 900 include non-volatile storage elements, the voltage for erasing or writing may be supplied through the signal line 516, or the writing voltage or the erasing voltage may be formed by an internal step-up circuit.

In the single chip microcomputer 1 shown in FIG. 12, in the non-volatile storage elements of the non-volatile memory block 4 and the programmable logic circuit 900 included therein, required operation program or data is written in response to the function of the single chip microcomputer 1 and the operation specification and function of the entire application system. When the non-volatile memory block 4 and the programmable logic circuit 900 include non-volatile storage elements for constituting EPROM, ultraviolet rays are irradiated to a window formed on the package of the single chip microcomputer 1 and the stored information is erased and new information is written. Or when the non-volatile memory block 4 and the programmable logic circuit 900 are constituted by non-volatile storage elements for constituting EEPROM, only required information is rewritten electrically, thereby changes of logic or correction of an error in the programmable logic circuit 900 becomes possible. Further changes of the program stored in the non-volatile memory block 4 or correction to an error becomes possible, and the single chip microcomputer 1 can flexibly deal with changes of the operation specification or function.

When the non-volatile memory block 4 and the programmable logic circuit 900 include non-volatile storage elements, if the single chip microcomputer 1 is not enclosed in the package with an window, in the development of the microcomputer application system, exchange to a new single chip microcomputer 1 with separate information written therein may be performed.

Figure 14:
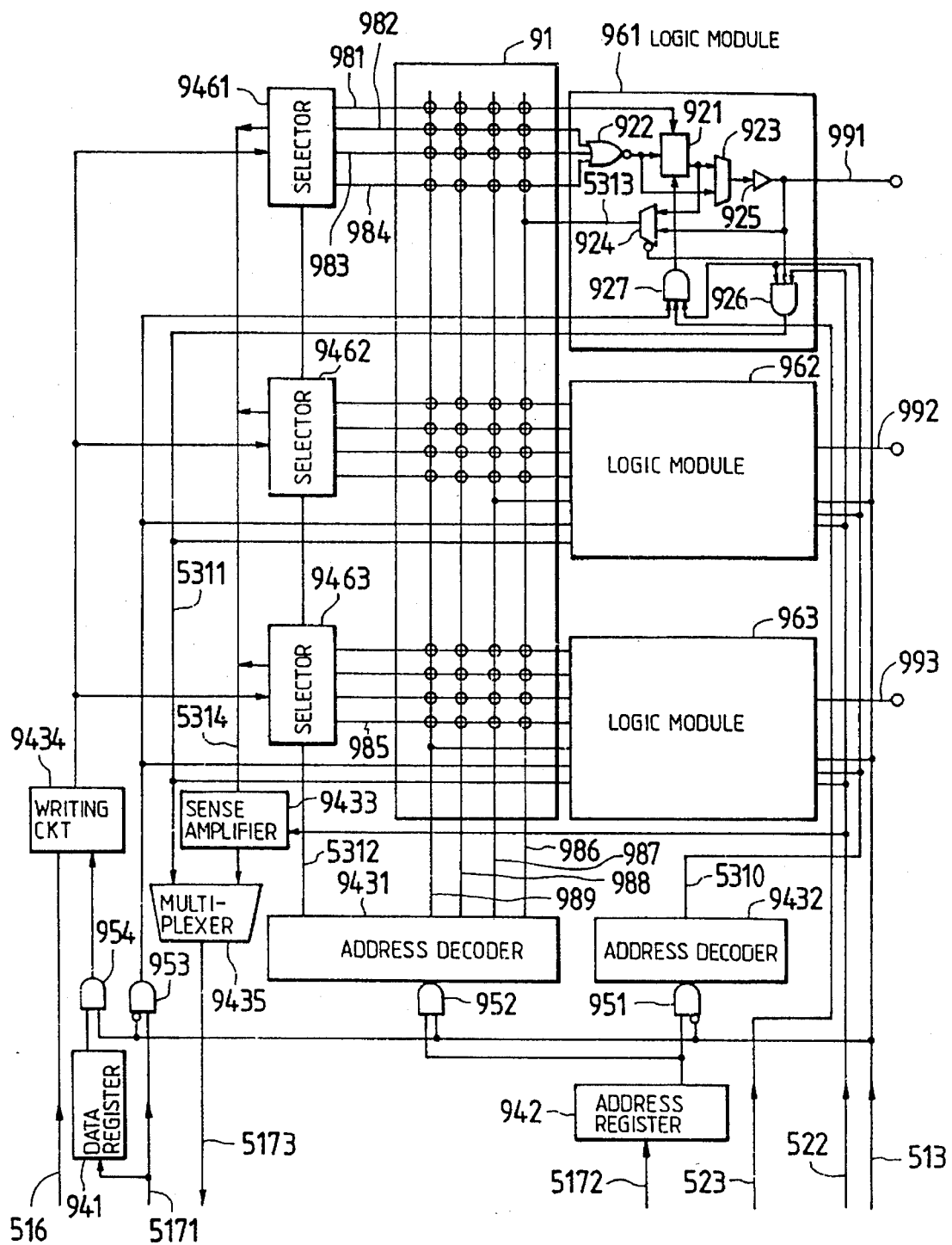
FIG. 14 is a detailed block diagram of an example of a logical function block.

FIG. 14 shows a detailed example of the programmable logic circuit 900.

In FIG. 14, numeral 91 designates a NOR array including non-volatile storage elements, numerals 961–963 designate logic modules, numerals 9461–9463 designate selectors, numeral 9433 designates a sense amplifier, numeral 9434 designates a writing circuit, numerals 9431, 9432 designate address decoders, numeral 941 designates a data register, numeral 942 designates an address register, and numeral 9435 designates a multiplexer.

The logic module 961 comprises a NOR gate 922, a flip flop 921, selectors 923 and 924, an output driver 925, and AND gates 926 and 927. The NOR array 91 may take logic configuration in response to the writing program state for a plurality of non-volatile storage elements included therein. The logic modules 961–963 perform changes for signals outputted in accordance with the logical configuration of the NOR array 91 so as to change the logic in response to the selective operation condition of the selectors 923, 924 and state of the flip-flop 921, and constitute the variable structure logic together with the NOR array 91.

The logic modules 961–963 can be interfaced indirectly with the data bus 42 and the address bus 41 through signal lines 5171–5173, and data can be inputted or outputted outside the single chip microcomputer 1 through terminals 991–993. When the control signal 513 is at a low level, the object of the data input/output is the flip flop 921 inside the logical modules 961–963. When the control signal 513 is at a high level, writing and reading to non-volatile storage elements to constitute the NOR logic of the NOR array 91 are made possible.

When the control signal 513 is made low and the internal device reading mode is set, the address signal outputted from the CPU 2 is supplied through the address bus 41 to the signal line 5172. The address signal is sent to the address register 942 and then supplied through the AND gate 951 to the address decoder 9432, and decoded by the address decoder 9432. The address decoder 9432 forms the selective signal which selects one among the logical modules 961–963 in response to the input address signal.

The output selective signal 5310 of the address decoder 9432 is supplied to the AND gate 926 of the logic module. The AND gate 926 is also supplied with the control signal 522 which is at a high level to correspond to the operation mode. Data from flip-flop 921 is outputted from AND gate 926 through the selector 923 and the output driver 925, and passes through the signal line 5311 and multiplexer 9435 and is read from the signal line 5173 to the data bus 42.

When the control signal 513 is made low and the internal device writing mode is set, the address signal outputted from the CPU 2 is supplied to the signal line 5172 and the data is supplied to the signal line 5171. Thereby the data is supplied through the AND gate 953 to the AND gate 927 of the logic module. The AND gate 927 is supplied with the control signal 523 which is at a high level to correspond to the operation mode, and with the selective signal in response to the decode result of the address signal from the address decoder 9432. Consequently, the output data of the CPU 2 can be written in flip-flop 921 assigned by the address signal.

When the control signal 513 is made high and the writing mode is set based on the external access, output of the address register 942 is supplied through the AND gate 952 to the address decoder 9431. The address decoder 9431 selects any of the word lines 986–989 of the NOR array 91 in response to the input address signal. Thereby data transferred from the outside of the single chip microcomputer 1 to the signal line 5171 is set to the data register 941, and is supplied through the AND gate 954 to the writing circuit 9434.

In synchronization with the timing of supplying the writing high voltage from the outside, the writing data is supplied to the selectors 9461–9463. The selecting signal 5312 of the address decoder 9431 selects the bit lines 981–985 in response to the input address signal, and the writing data is given to the selected bit line, thereby the writing to non-volatile storage elements is performed. Then the selector 924 inside of the logic module is controlled at its output in a high impedance state by the signal 513. Thus mixing of undesired signals from the logic module into the word lines 986–989 is suppressed.

When the control signal 513 is made high and the reading mode is set based on the external access, in similar manner to the writing mode, the bit line data of the NOR array 91 assigned by the address decoder 9431 is supplied through the selectors 9461–9463 to the sense amplifier 9433 and is read through the multiplexer 9435 to the signal line 5173.

As described above, when the control signal supplied from the outside is at a low level, input/output of the data with the flip-flop 921 of logic modules 961–963 is performed, and when the control signal 513 is at a high level, the writing/reading based on the external access is performed to the NOR array 91 comprising non-volatile storage elements. When non-volatile storage elements capable of being written or erased electrically are used in the NOR array 91, an erasing circuit may be added. Thus the erasing operation can be performed in a similar circuit constitution to that of the writing.

Even if the configuration of the programmable logic circuit 900 is varied, for example, when a plurality of NOR arrays 91 exist or the logic structure inside of the logic modules 961–963 is different, when the number of the flip-flops 921 are different, and when the signal lines 991–993 from the logic modules 961–963 to the external terminal do not exist, the configuration similar to that of the present embodiment can be adopted so as to enable the access from the CPU 2 of the single chip microcomputer and the external terminal.

According to the above description, the programmable logic circuit 900 of the single chip microcomputer 1 shown in FIG. 12 can include the PLA 6 in FIG. 7, the subprocessor 100 in FIG. 11, and further the circuit shown in FIG. 14 as the logical function block being the variable logic structure, and the programmable logic circuit 900 and the non-volatile block 4, although not particularly limited thereto, can be arranged in the same linear address space.

Figure 15:
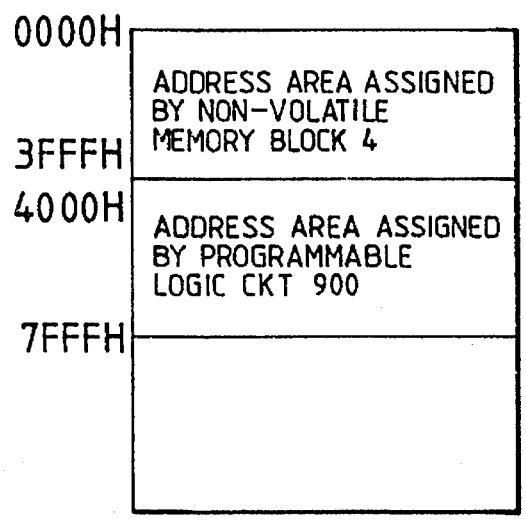
FIG. 15 is an explanation diagram illustrating an example of address mapping state between a logical function block and a non-volatile memory block.

FIG. 15 shows an example of the address mapping state of the programmable logic circuit 900 and the non-volatile memory block 4 on the same address space. According to FIG. 15, addresses of 0000H–3FFFH are allocated to the non-volatile memory block 4, and addresses of 4000H–7FFFH are allocated to the programmable logic circuit 900. Since the programmable logic circuit 900 and the non-volatile memory block 4 are arranged in the same address space in this manner, different addresses can be supplied to both from the outside of the single chip microcomputer 1 thereby writing and test reading can be performed.

When addresses, data, control signals, timing and the like required in writing and test reading are made nearly the same as those in the standard single EPROM, in other words, when they are adapted for the general specification of the general writing device such as EPROM writer that the single EPROM or EEPROM is programmed, the general writing device is used as it is, thereby the writing and test reading can be performed to non-volatile memory elements included in the single chip microcomputer 1. When the control signal 513 is made high and the writing/reading mode is set from the outside, the address bus 41 and the data bus 42 are separated from the CPU 2 by the gates of such switch elements as 61, 62. Consequently, in the corresponding operation mode, the function of the single chip microcomputer 1 appears similar to the non-volatile memory.

Figure 17:
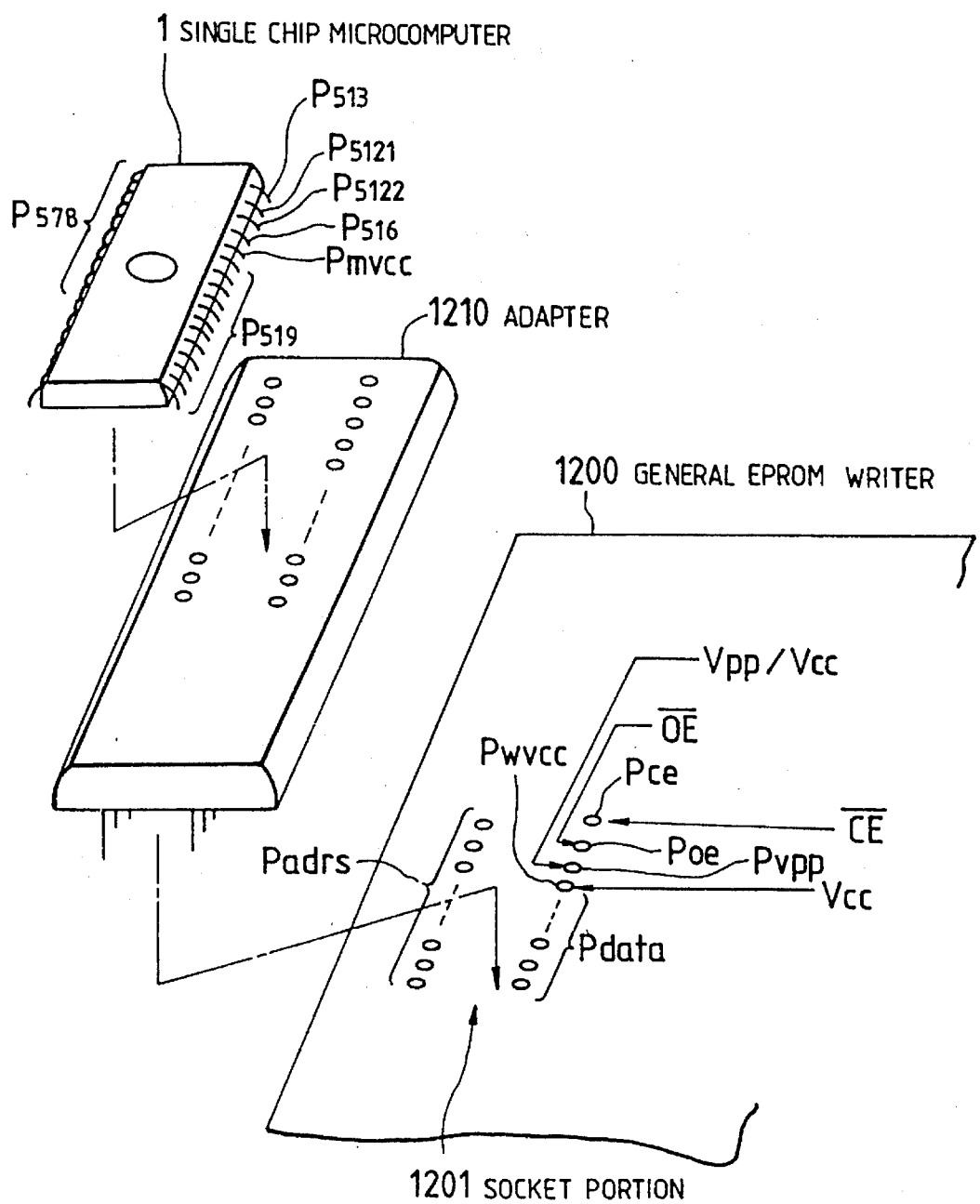
FIG. 17 is an appearance perspective view of the whole body when writing/test reading of a single chip microcomputer is performed through an adapter by a general EPROM writer.

The general EPROM writer 1200 for writing and test reading the non-volatile semiconductor storage device, although not particularly limited thereto, is shown in FIG. 17.

The EPROM writer 1200 is comprised of a power source terminal Pwvcc supplying the power source voltage Vcc (for example 5V), an address output terminal Padrs for outputting address signals, a control terminal Poe for outputting the output enable signal OE used to command the data input/output direction, a terminal Pvpp which can selectively output the writing high voltage Vpp or the power source voltage Vcc, a control terminal Pce outputting the chip enable signal CE used to command selection/nonselection of a chip, and a data input/output terminal Pdata for inputting the read data and outputting the write data, all being arranged on a socket portion 1201.

In such an EPROM writer 1200, at the writing operation state, the output enable signal $\overline{OE}$ is made high, the chip enable signal $\overline{CE}$ is made low, and the output terminal of the writing voltage Vpp is made as a high voltage 12.5[V]. On the other hand, at the test reading state, the output enable signal $\overline{OE}$ is made low, the chip enable signal $\overline{CE}$ is made low, and the output terminal of the writing voltage Vpp is set to a voltage of about 5[V] corresponding to the power source voltage Vcc.

In the EPROM writer 1200, the terminal arrangement of the socket portion 1201 is adapted for the arrangement of external terminals in a general EPROM, so that the writing of data and the verifying can be performed on a general EPROM, such as that manufactured by Hitachi, Ltd. under product names HN482764G, HN27C64G, HN4827128G, HN27128AG, HN27256G, HN27C256G or HN275612G.

The EPROM writer 1200 and the single chip microcomputer 1 shown in FIG. 12 are electrically connected, as shown in FIG. 17 through an adapter 1210 connecting required terminals of both devices in consideration of a difference between both devices in the number and arrangement of external terminals.

Figure 18:
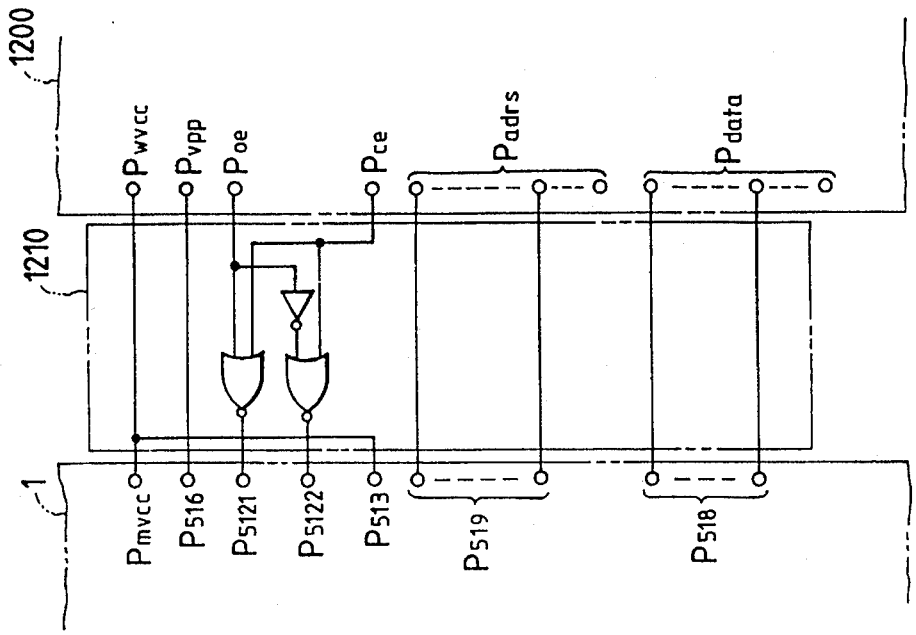
FIG. 18 is an explanation diagram of an example of mode when the single chip microcomputer and the general EPROM writer are connected by the adapter.

FIG. 18 shows an example of a mode for connecting the single chip microcomputer 1 and the general EPROM writer 1200 through the adapter 1210. That is, the inverted signal of the chip enable signal $\overline{CE}$ outputted from the control terminal Pce of the general EPROM writer 1200 is supplied as the control signal 513 shown in FIG. 12 to the external terminal P513 of the single chip microcomputer 1. The writing voltage Vpp or the power source voltage Vcc selectively outputted from the external terminal Pvpp of the general EPROM writer 1200 is supplied through the external terminal P516 of the single chip microcomputer 1 shown in FIG. 12 to the signal line 516. The inverted level of the output enable signal $\overline{OE}$ outputted from the control terminal Poe of the general EPROM writer 1200 is supplied as the control signal 5121 of FIG. 12 to the external terminal P5121 of the single chip microcomputer 1. The output enable signal $\overline{OE}$ is supplied as the control signal 5122 of FIG. 12 to the external terminal P5122 of the single chip microcomputer 1. The address signal outputted from the address output terminal Padrs of the general EPROM writer 1200 is supplied through the external terminal P519 of the single chip microcomputer 1 to the signal line 519. The data input/output terminal Pdata of the general EPROM writer 1200 is connected to the data input/output terminal P518 corresponding to the signal line 518 of the single chip microcomputer 1. Lastly, the power source terminal Pwvcc of the general EPROM writer 1200 is connected to the power source terminal Pmvcc of the single chip microcomputer 1.

In such a constitution that the control signal 5121 is made the inverted level signal of the control signal 5122 by an invertor (not shown) located inside the control signal generating circuit 50 and only the control signal 5122 is supplied directly from the external terminal, the output enable signal $\overline{OE}$ is supplied directly to the corresponding external terminal.

Figure 19:
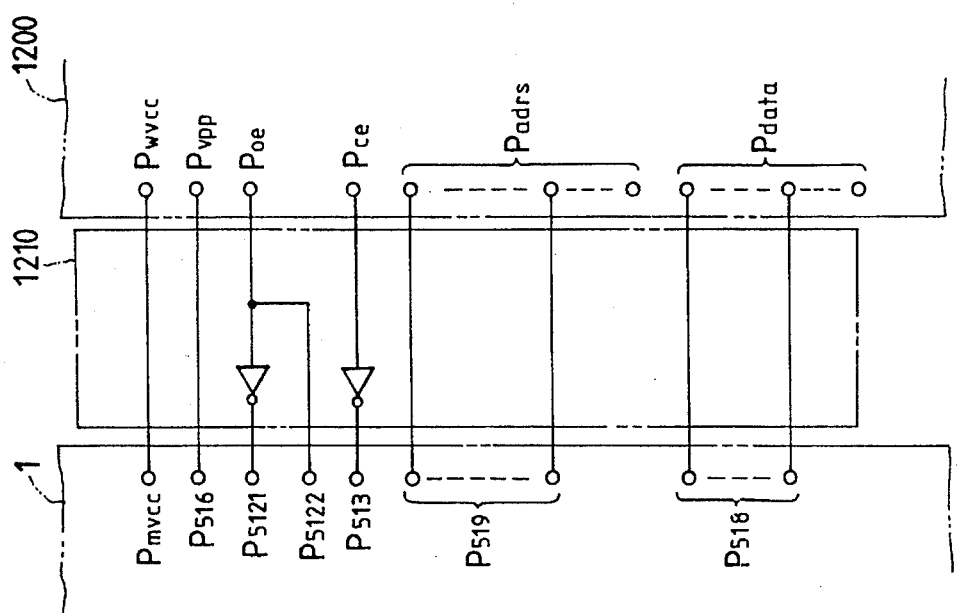
FIG. 19 is an explanation diagram of another mode when the single chip microcomputer and the general EPROM writer are connected by the adapter; and, FIG. 20 is a block diagram of an example of a single chip microcomputer adopting microprogram control.

FIG. 19 shows another example of a connection mode. In such a mode, the power source voltage Vcc outputted from the power source terminal Pwvcc on the adapter 1210 is supplied as the control signal 513 of a high level to the external terminal P513 of the single chip microcomputer 1. Applying the NOR logic on the adapter to the output enable signal $\overline{OE}$ and the chip enable signal $\overline{CE}$ results in these signals being supplied as the control signal 5121 to the external terminal P5121 of the single chip microcomputer 1. Further by applying the NOR logic on the adapter 1210 to the inverted level of the output enable signal OE and the chip enable signal $\overline{CE}$ these signals are supplied as the control signal 5122 to the external terminal P5122 of the single chip microcomputer 1. All other connections are similar to those shown in FIG. 18.

Although not particularly limited thereto, the wiring and the circuit shown in FIG. 18 or FIG. 19 are incorporated in the adapter 1210.

Figure 16:
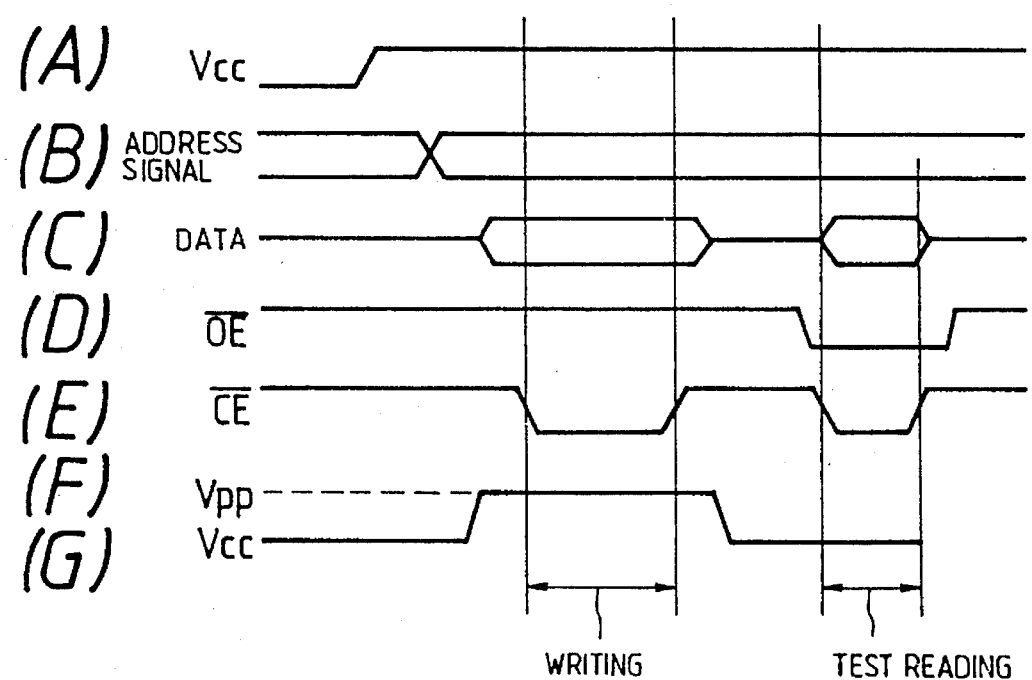
FIG. 16 (A)–(G) is a timing chart of an example illustrating timing required in test reading operation for data writing and verifying to the logical function block and the non-volatile memory block contained in the single chip microcomputer shown in FIG. 12.

FIG. 16 (A)–(G) shows a timing chart required for data writing and test reading, where the data being supplied is from the EPROM writer 1200 to the single chip microcomputer 1 through the adapter 1210.

When the single chip microcomputer 1 is connected to the general EPROM writer 1200 as described above, if the power source voltage Vcc of about 5[V] is applied to the single chip microcomputer 1, the single chip microcomputer 1 becomes operable. Then in a sequence of steps the address signal of an address to be written in the non-volatile memory block 4 or the programmable logic circuit 900 is outputted from the general EPROM writer 1200, the output enable signal OE is held to a high level, the writing voltage Vpp of about 12.5[V] is outputted, and the chip enable signal CE is asserted to a low level. Thereby the writing of data is started to the required non-volatile storage element selected by the address information.

The time period of asserting the chip enable signal $\overline{CE}$ to a low level is dependent on the characteristics of the non-volatile storage element constituting the EPROM, nevertheless a typical time period is approximately 1 msec. The chip enable signal $\overline{CE}$ is negated to a high level, and the writing voltage Vpp supplied to the signal line 516 of the single chip microcomputer 1 is returned to the power source voltage Vcc, thereby ending the writing mode.

The output enable signal $\overline{OE}$ is asserted to a low level, and the address signal utilized in writing is outputted and the chip enable signal $\overline{CE}$ is asserted to a low level, thereby outputting data of the non-volatile storage element selected by the address signal from the single chip microcomputer 1. Judging is performed regarding whether the read data is or is not coincident with the written data, thereby verifying processing is performed regarding whether the data is or is not written normally by the writing operation. Although not particularly limited thereto, the judging in the present embodiment is performed within the EPROM writer 1200.

When the writing of required data and the verifying are performed in this manner, the single chip microcomputer 1 can execute the data processing depending on the logic attained by the writing state.

Figure 20:
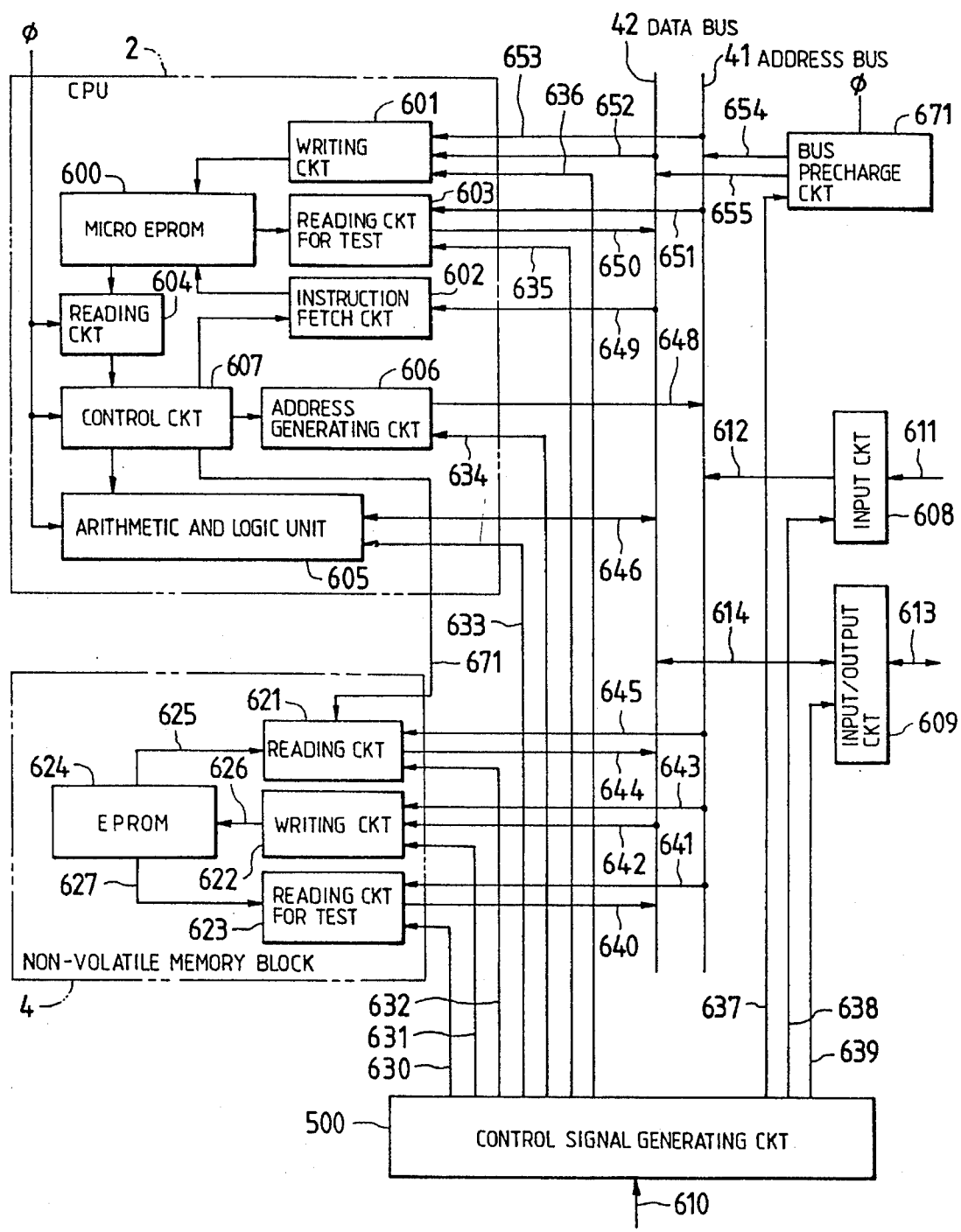

FIG. 20 shows an example of a single chip microcomputer including a CPU 2 adopting the microprogram control.

The single chip microcomputer of FIG. 20 is provided with an EPROM for storing a microprogram (hereinafter referred to simply as micro EPROM) as a device including non-volatile storage elements, and an EPROM 624 for storing the operation program comprising a plurality of macro instructions, both being arranged on one semiconductor substrate.

The micro EPROM 600 included in the CPU 2 is connected to a writing circuit 601 which in turn is connected to the address bus 41 and the data bus 42 by signal lines 653, 652; a test reading circuit 603 which in turn is connected to the address bus 41 and the data bus 42 by signal lines 651, 650; an instruction fetch circuit 602 which in turn is connected to the data bus 42; and a reading circuit 604 for reading micro instructions of the micro EPROM 600 at the instruction control operation state. The micro instructions outputted from the reading circuit 604 are supplied to a control circuit 607 and decoded, thereby generated control signals control an arithmetic and logic circuit 605 and the instruction fetch circuit 602 as well as an address generating circuit 606. The address generating circuit 606 supplies address of the macro instructions through a signal line 648 to the address bus 41. The CPU 2 is operated in synchronization with the clock signal ϕ.

The non-volatile memory block 4 is comprised of a reading circuit 621, a writing circuit 622, a test reading circuit 623, all connected respectively to the address bus 41 and the data bus 42, and an EPROM 624 connected to these preceding three circuits. The reading circuit 621 is also connected to the control circuit 607 of the CPU 2. The address bus 41 and the data bus 42 are connected to a bus precharge circuit 671 controlled by the clock signal ϕ; and by the signal lines 654, 655. Additionally, the address bus 41 is interfaced through the signal line 612, to the input circuit 608 and in turn the signal line 611 which allows interaction with the outside of the single chip microcomputer. Also the data bus 42 can be interfaced through the signal line 614, to the input/output circuit 609 and in turn to the signal line 613 which allows interaction with the outside of the single chip microcomputer.

Outputs 630–639 of the control signal generating circuit 500 connected to the control signal line 610 from the outside are connected to each of the above-mentioned circuits so as to control the instruction control operation and the reading and the test operation to the micro EPROM 600 and the EPROM 624.

Writing to the micro EPROM 600 is set by supplying the writing mode signal to the control signal input line 610. In this state, among the outputs 630–639 of the control signal generating circuit 500, the control signal 636 of the writing circuit 601, the control signal 638 of the input circuit 608 and the control signal 639 of the input/output circuit 609 only become effective, the other control signals are controlled to nonactive states. That is, output from the CPU 2, the non-volatile memory block 4 and the bus precharge circuit 671 to the data bus 42 and the address bus 41 is inhibited, and each of the buses 41, 42 is only used for the writing through the writing circuit 601 to the micro EPROM 600.

The address information used to select required elements from the non-volatile storage element group constituting the micro EPROM 600 is given to the external connection line 611 of the input circuit 608. Writing data sent to the storage element selected by the address information is given from the external connection line 613 of the input/output circuit 609 controlled in the input direction, and the writing signal is given to the control input line 610. Thereby required micro instruction information is written to the prescribed address of the micro EPROM 600 assigned by the external address signal.

Testing with respect to whether or not the writing operation has been performed correctly is performed when the mode signal for the test reading of the micro EPROM 600 is given to the control input line 610. If the operation mode is set, among the outputs 630–639 of the control signal generating circuit 500, the control signal 635 of the test reading circuit 603, the control signal 638 of the input circuit 608, and the control signal 639 of the output circuit 609 become effective. Thereby if the address signal is supplied to the external input line 611 and the mode signal for the test reading of the micro EPROM 600 is given to the control input line 610, the input/output circuit 609 is controlled to be in the output direction, and the reading data of the selected micro EPROM 600 is outputted through the test reading circuit 603, the connection line 650, the data bus 42, the connection line 614 and the input/output circuit 609 to the external connection line 613. Thereby allowing verification to become possible at the outside.

Writing and test reading to the non-volatile storage element group 624 of the non-volatile memory block 4 is also performed in a similar manner to the writing and test reading of the micro EPROM 600 in that the writing circuit 622, the test reading circuit 623, the input/output circuit 603 and the input/output circuit 609 are controlled by the control signals from the control signal generating circuit 500.

Operation of the semiconductor integrated circuit at normal mode, i.e., at the instruction control operation is performed in synchronization with clock ϕ in the following manner. If the address information generated by the address generating circuit 606 is transmitted through the address bus 41 to the reading circuit 621 a prescribed macro instruction is read from the non-volatile storage element group 624 based on the signal received from the control circuit 607 and is taken through the data bus 42 to the instruction fetch circuit 602. The information held in the instruction fetch circuit 602 is given to the micro EPROM 600, and the micro EPROM 600 is addressed based on this information and the micro instruction is read in the reading circuit 604 in response to the addressing.

The read information is made control information inside the CPU 2. The micro instruction read in the reading circuit 604 is inputted to the control circuit 607 and decoded, and based on the decoding, control of the arithmetic and logic unit 605, the address generating circuit 606, the instruction fetch circuit 602, the memory reading circuit 621 and the like is performed. In such instruction control operations, the data bus 42 and the address bus 41 are precharged by the bus precharge circuit 671 acting in synchronization with the clock signal ϕ. Thus a series of operations of the single chip microcomputer is synchyronized with the clock signal ϕ supplied to the CPU 2. The parallel output bit number of the test reading circuit 603 and the reading circuit 604 in the CPU 2 need not be equal, and in the embodiment the parallel output bit number from the test reading circuit 603 is equal to the bit number of the data bus 42.

According to the present invention the following effects can be obtained.

(1) The present invention involves the utilization of a semiconductor integrated circuit for data processing. The circuit is composed of various elements including a logical function block which can realize a required logic function in response to a selected writing state for a non-volatile storage element, a logical operation control block which makes the logical function block perform the selected logical operations, and a non-volatile memory block which includes a non-volatile storage element. The above elements of the integrated circuit can be formed, if necessary, on a single semiconductor substrate. Depending upon the function required of the data processing system being developed, steps of either writing required data into the logic circuit block or of writing required software programs into the non-volatile memory block may be executed. Thus, the process of setting the function of the semiconductor integrated circuit for a particular data processing performance can be rapidly and simply accomplished in response to the required specifications of the system. This ability allows for changes of the systems function to be addressed with a high degree of flexibility and ease.

(2) In recent years a key component of a data processing system has been a semiconductor integrated circuit having various sorts of peripheral functions upon a single chip. It is expected that circuit parts which will be required to change as the operation specification and function of the data processing system is changed will come to be included in the semiconductor integrated circuit. In such circumstances, when there is a change of the operation specification and function of the system, it may be dealt with through a step of writing to the logic circuit block, such as a programmable logic structure, incorporated on the semiconductor integrated circuit. In this manner, changes to a LSI or the necessity of a circuit to be installed at the outside of the semiconductor integrated circuit decreases thus contributing significantly to a decrease of the development time of the data processing system resulting in a reduction of the cost of such development.

(3) In the semiconductor integrated circuit of the present invention, the operation specification which enables writing to the semiconductor integrated circuit from the outside by a writing device such as a general EPROM writer is provided. Thus, when data which is required is written to the non-volatile storage element of the semiconductor integrated circuit, a special device is not necessary, rather a general EPROM can be utilized and writing and test reading can thus be performed. Consequently, during debugging or development of the system and also during mass production, the ability to use a general EPROM type writing device greatly improves the convenience of writing to the non-volatile storage element.

(4) To write to the logical function block and the non-volatile storage element of the non-volatile memory block from the outside through the use of a writing device such as a general EPROM writer, the semiconductor integrated circuit can be made to function in a similar manner to the non-volatile single memory such as an EPROM. Thus, the writing device such as a general EPROM writer may use an adapter such as a socket adapter with a simple constitution to change the differences between the semiconductor integrated circuit and the general writing device to allow an interface between the semiconductor integrated circuit and the general EPROM writer. The above further adding to the convenience of writing to the non-volatile storage element of the semiconductor integrated circuit.

(5) The logical function block and the non-volatile memory block are commonly connected to the internal address bus and the internal data bus. Further, the external access terminal for data and addressing information to be interfaced with the external writing device is made common between the logical function block and the non-volatile memory block. Additionally, both of the above are arranged in the same address space. Therefore, when the logical function block and the non-volatile memory block are written to by the external writing device a special processing or circuitry is not required for changing the address space, but only a change of the address signal is required. Therefore, the writing of information becomes possible by the common writing device to both logical function block and the non-volatile memory block.

The invention by the present inventors has been specifically described based on the embodiments. However, the invention is not limited to the embodiments and various changes may be made without departing from the spirit and scope of the invention.

For example, in the described embodiments, to enable writing to the logical function block or the non-volatile memory block from the outside using the external writing device, the single chip microcomputer is specified to in function in a similar manner to the single EPROM. However, the invention is not limited to such operation specifications. A control circuit with communication means or interface means may be interposed between the single chip microcomputer and the general EPROM writer, and various sorts of information required for the writing and outputting from the general EPROM writer is supplied through the interface means to a required I/O of the single chip microcomputer, and the incorporated CPU performs required control operations according to the information supplied in this manner and the writing thus becomes possible. In this case, the writing operation command to the CPU may be included as part of the address signal outputted from the general EPROM writer.

Also in the embodiments, the logical function block and the non-volatile memory block are commonly connected to the internal address bus and the internal data bus, but the logical function block does not always need to be connected to the internal address bus and the internal data bus. When it is not connected to the internal address bus and the internal data bus, an exclusive transmission path for verifying may be provided between the non-volatile storage element of the logical function block and the external terminal.

The logical function block and the non-volatile memory block are not limited to the arrangement in the same address space being linear but may be arranged in different spaces. In this case, when writing or test reading is performed to the logical function block or the non-volatile memory block from the outside, changing control of spaces is required. In such space changing, the space changing signal may be supplied by a simple switch on the adapter to the terminal allocated for such changing in an exclusive or prescribed operation mode.

Configuration of the logical function block to realize required logical functions in response to the writing state to the non-volatile storage element configuration of the non-volatile memory block to store software program, configuration of the non-volatile storage element capable of being written to and included therein, and the processing content to writing data to those members are not limited to the embodiments but may be suitably changed.

The semiconductor integrated circuit for data processing is not limited to enclosing in a package with a window to enable erasing of information by irradiating ultraviolet rays, rather writing of only one time may be allowed. In this case, the single chip microcomputers having entirely the same structure are used and new information is written therein and installed on the system. Thus a change of the operation specification and function midway into development of the system can be dealt with by the single chip microcomputer with the same structure.

In the above description, the invention is directed mainly to the single chip microcomputer. However, the invention is not limited to this, and can be applied to various sorts of the semiconductor integrated circuits for data processing and development of various types of the data processing systems.

What is claimed is:

1. A method of developing a data processing system comprising a semiconductor integrated circuit device on a single chip which includes:

a central processing unit;

an interface circuit;

an internal bus coupled to the central processing unit and to the interface circuit;

a sub-processor coupled to the internal bus and to the interface circuit and including:

non-volatile memory elements in which instructions are to be stored;

a control circuit which generates control signals in accordance with the instructions stored in the non-volatile memory elements; and an arithmetic logic unit which is controlled by the generated control signals, one of the generated control signals being used for controlling the interface circuit, wherein the semiconductor integrated circuit device has:

a first operation mode that enables the non-volatile memory elements to write data, and a second operation mode that enables the central processing unit and the sub-processor to perform data processing for the data processing system, and disables the central processing unit to access the non-volatile memory elements, the method comprising the steps of:

(a) setting an operation mode of the semiconductor integrated circuit device into the first operation mode;

(b) after the step (a), writing data to the non-volatile memory elements to store instructions;

(c) changing the operation mode of the semiconductor integrated circuit device from the first operation mode to the second operation mode to operate the semiconductor integrated circuit device serving as the data processing system;

(d) after the step (c), checking whether or not a function of the data processing system which is realized by the semiconductor integrated circuit device operating in the second operation mode is satisfactory;

(e) completing development of the data processing system if the function of the data processing system is satisfactory;

(f) changing the operation mode of the semiconductor integrated circuit device from the second operation mode to the first operation mode if the function of the data processing system is not satisfactory;

(g) after the step (f), erasing the data for at least one instruction stored in the non-volatile memory elements and writing new data for at least one substitute instruction to the non-volatile memory elements; and (h) after the step (g), repeating the steps (c) to (g).

2. The method according to claim 1, wherein the steps (b) and (g) are performed by an external writer which is coupled to the internal bus of the semiconductor integrated circuit device operating in the first operation mode.

3. The method according to claim 2, further comprising:

(i) after step (b), reading out the data from the non-volatile memory elements to the external writer to verify the data.

4. The method according to claim 3, wherein the internal bus includes an internal address bus and an internal data bus; and wherein the second operation mode includes:

an external read mode where address signals from the central processing unit are outputted from the semiconductor integrated circuit device to outside of the semiconductor integrated circuit device via the internal address bus, and external data based on the address signal is inputted from the outside of the semiconductor integrated circuit device to the internal data bus; and an external write mode where address signals from the central processing unit are outputted from the semiconductor integrated circuit device to outside of the semiconductor integrated circuit device via the internal address bus, and data outputted from the central processing unit is outputted to the outside of the semiconductor integrated circuit device via the internal data bus.

5. A method of developing a data processing system comprising a semiconductor integrated circuit device on a single chip which includes:

a central processing unit;

an interface circuit;

an internal bus coupled to the central processing unit and to the interface circuit; and a sub-processor coupled to the internal bus and to the interface circuit and including:

non-volatile memory elements in which instructions are to be stored;

a control circuit which generates control signals in accordance with the instructions stored in the non-volatile memory element, and an arithmetic logic unit which is controlled by the generated control signals, one of the generated control signals being used for controlling the interface circuit, wherein the semiconductor integrated circuit device has:

a first operation mode which enables the non-volatile memory elements to write data, and a second operation mode which enables the central processing unit and the sub-processor to perform data processing for the data processing system, and disables the central processing unit to access the non-volatile memory elements, the method comprising the steps of:

(a) in the first operation mode, writing data to the non-volatile memory elements to store instructions;

(b) in the second operation mode, operating the semiconductor integrated circuit device serving as the data processing system;

(c) checking whether or not a function of the data processing system which is realized by the semiconductor integrated circuit device operating in the second operation mode satisfies a required function;

(d) completing development of the data processing system if the function of the data processing system satisfies the required function;

(e) in the first operation mode, changing the data stored in the non-volatile memory elements so as to satisfy the required function if the function of the data processing system does not satisfy the required function; and (f) after the step (e), repeating the step (b) to the step (e).

6. The method according to claim 5, wherein the step (e) further includes:

electrically erasing at least one instruction stored in the non-volatile memory elements; and rewriting new data as at least one substitute instruction into the non-volatile memory elements.

7. The method according to claim 5, wherein the step (e) further includes:

erasing all the data as all the instructions stored in the non-volatile memory elements by irradiating ultraviolet ray; and rewriting new data as substitute instructions into the non-volatile memory elements.

8. The method according to claim 5, wherein the steps (a) and (e) are performed by an external writer which is coupled to the internal bus of the semiconductor integrated circuit device operating in the first operation mode.

9. The method according to claim 8, further comprising:
(g) after the step (a), reading out the data from the non-volatile nemory elements to the external writer to verify the data.

10. The method according to claim 9,
wherein the internal bus includes an internal address bus and an internal data bus; and
wherein the second operation mode includes:
an external read mode where address signals from the central processing unit are outputted from the semiconductor integrated circuit device to outside of the semiconductor integrated circuit device via the internal address bus, and external data based on the address signal is inputted from the outside of the semiconductor integrated circuit device to the internal data bus; and,
an external write mode where address signals from the central processing unit are outputted from the semiconductor integrated circuit device to outside of the semiconductor integrated circuit device via the internal address bus, and data outputted from the central processing unit is ouputted to the outside of the semiconductor integrated circuit device via the internal data bus.

11. A method of developing a data processing system to be comprised of semiconductor integrated circuit devices each of which is on a single chip and includes:
a central processing unit;
an interface circuit;
an internal bus coupled to the central processing unit and to the interface circuit; and
a sub-processor coupled to the internal bus and to the interface circuit and including:
non-volatile memory elements in which instructions are to be stored;
a control circuit which generates control signals in accordance with the instructions stored in the non-volatile memory elements; and
an arithmetic logic unit which is controlled by the generated control signals, one of the generated control signals being used for controlling the interface circuit,
wherein each of the semiconductor integrated circuit devices has:
a first operation mode which enables the non-volatile memory element to write data, and
a second operation mode which enables the central processing unit and the sub-processor to perform data processing for the data processing system, and disables the central processing unit to access the non-volatile memory element,
the method comprising the steps of:
(a) preparing the a first one of the semiconductor integrated circuit [device] devices for writing data therein;
(b) in the first operation mode, writing data to the non-volatile memory elements of the first semiconductor integrated circuit device to store instructions;
(c) in the second operation mode, operating the first semiconductor integrated circuit device serving as the data processing system;
(d) checking whether or not a function of the data processing system which is realized by the first semiconductor integrated circuit device operating in the second operation mode satisfies a required function;
(e) completing development of the data processing system if the function of the data processing system including the first semiconductor integrated circuit device satisfies the required function;
(f) preparing a second one of the semiconductor integrated circuit devices if the function of the data processing system including the first semiconductor integrated circuit device does not satisfy the required function;
(g) in the first operation mode, writing data to the non-volatile memory elements of the second semiconductor integrated circuit device to store new instructions;
(h) replacing the first semiconductor integrated circuit device with the second semiconductor integrated circuit device in the data processing system, and operating the second semiconductor integrated circuit device in the second operation mode serving as the data processing system;
(i) checking whether or not the function of the data processing system which is realized by the second semiconductor integrated circuit device operating in the second operation mode satisfies the required function;
(j) completing development of the data processing system if the function of the data processing system including the second semiconductor integrated circuit device satisfies the required function; and
(k) repeating the steps (f) to (j) after replacing the second semiconductor integrated circuit device with another semiconductor integrated circuit device if the function of the data processing system including the second semiconductor integrated circuit device does not satisfy the required function.

12. The method according to claim 11, wherein the steps (b) and (g) are performed by an external writer which is coupled to the internal bus of the corresponding semiconductor integrated circuit device operating in the first operation mode.

13. The method according to claim 12, further comprising after steps (b) and (g), reading out the data from the non-volatile memory elements to the external writer to verify the data.

14. The method according to claim 13,
wherein the internal bus includes an internal address bus and an internal data bus; and
wherein the second mode includes:
an external read mode where address signals from the central processing unit are outputted from the corresponding semiconductor integrated circuit device to outside of the corresponding semiconductor integrated device via the internal address bus, and external data based on the address signals is inputted frown outside of the corresponding semiconductor integrated circuit device to the internal data bus, and an external write mode where address signals from the central processing unit are outputted from the corresponding semiconductor integrated circuit device to outside of the corresponding semiconductor integrated circuit device via the internal address bus, and data outputted from the central processing unit is outputted from the outside of the corresponding semiconductor integrated circuit device via the internal data bus.

* * * * *

UNITED STATES PATENT AND TRADEMARK OFFICE
CERTIFICATE OF CORRECTION

PATENT NO. : 5,511,211
DATED : April 23, 1996
INVENTOR(S) : Yasushi Akao, et al.

It is certified that error appears in the above-indentified patent and that said Letters Patent is hereby corrected as shown below:

Claim 14, column 26, line 61, after "integrated" insert --circuit--.

Claim 14, column 27, line 2, delete "frown" and insert therefor --from--.

Signed and Sealed this

Third Day of September, 1996

Attest:

BRUCE LEHMAN

Attesting Officer     Commissioner of Patents and Trademarks